(12) United States Patent
Alexander et al.

(10) Patent No.: US 9,801,482 B1
(45) Date of Patent: Oct. 31, 2017

(54) DRINKWARE AND PLATEWARE AND ACTIVE TEMPERATURE CONTROL MODULE FOR SAME

(71) Applicant: Ember Technologies, Inc., Westlake Village, CA (US)

(72) Inventors: Clayton Alexander, Westlake Village, CA (US); Christopher Thomas Wakeham, Solana Beach, CA (US); Daren John Leith, Agoura Hills, CA (US); Mikko Juhani Timperi, San Marcos, CA (US); Frank Victor Baumann, San Diego, CA (US); Farzam Roknaldin, Westlake Village, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 0 days.

(21) Appl. No.: 15/593,085

(22) Filed: May 11, 2017

Related U.S. Application Data

(60) Provisional application No. 62/335,443, filed on May 12, 2016.

(51) Int. Cl.
*A47J 27/21* (2006.01)
*A47J 27/00* (2006.01)
(Continued)

(52) U.S. Cl.
CPC ....... *A47G 19/2288* (2013.01); *H05B 1/0244* (2013.01); *H04B 1/38* (2013.01); *H05B 2203/021* (2013.01)

(58) Field of Classification Search
None
See application file for complete search history.

(56) References Cited

U.S. PATENT DOCUMENTS 1,649,067 A * 11/1927 Karlson .............. A47J 36/2461
219/436
1,721,311 A 7/1929 Muenchen
2,046,125 A * 6/1936 Lacy ................... A47J 36/2461
219/436
(Continued)

FOREIGN PATENT DOCUMENTS

CH 631614 8/1982
CN 1338240 A 3/2002
(Continued)

OTHER PUBLICATIONS

Second Office Action dated Apr. 10, 2017 in CN Application No. 201510869257.5.
(Continued)

*Primary Examiner* — Thor Campbell
(74) *Attorney, Agent, or Firm* — Knobbe, Martens, Olson & Bear LLP

(57) ABSTRACT

An active temperature control module can be used with drinkware and plateware devices. The drinkware can be a mug made of metal, and optionally coated with a ceramic material. The active thermal control module can optionally be removably coupleable to a surface of the drinkware or plateware device. The module can include at least one heating element that can thermally communicate with a surface of the drinkware or plateware device to thereby effect heat transfer through the base to food stuff (e.g., a solid food, a liquid food) in the drinkware or plateware device. The module can include at least one sensor configured to sense a parameter of the foodstuff, and at least one power storage element configured to provide power to the at least one heating element. The module can include control circuitry configured to control operation of the one or more heating elements, and a transceiver configured to transmit operating information of the module to a remote electronic device and to receive operating instructions from the remote electronic device. Optionally, the module can include a heat transfer pack that can thermally communicate with the at least one heating element, and which can be interposed between the at least one heating element and a surface of the drinkware or plateware device.

20 Claims, 28 Drawing Sheets

(51) Int. Cl.
*A47G 19/22* (2006.01)
*H05B 1/02* (2006.01)
*H04B 1/38* (2015.01)

(56) References Cited

U.S. PATENT DOCUMENTS

| | | | |
|---|---|---|---|
| 3,064,113 A | 11/1962 | Pitrone | |
| 3,463,140 A | 8/1969 | Rollor | |
| 3,603,106 A | 9/1971 | Ryan et al. | |
| 3,622,753 A | 11/1971 | Lax | |
| 3,678,248 A | 7/1972 | Tricault et al. | |
| 3,739,148 A | 6/1973 | Ryckman, Jr. | |
| 3,766,975 A | 10/1973 | Todd | |
| 3,797,563 A | 3/1974 | Hoffmann et al. | |
| 3,892,945 A * | 7/1975 | Lerner | A47J 36/2433 |
| | | | 200/85 R |
| 3,931,494 A * | 1/1976 | Fisher | A47J 36/2461 |
| | | | 219/386 |
| 4,068,115 A | 1/1978 | MacK et al. | |
| 4,095,090 A * | 6/1978 | Pianezza | A47G 19/2288 |
| | | | 219/435 |
| 4,134,004 A | 1/1979 | Anderson et al. | |
| 4,442,343 A | 4/1984 | Genuit et al. | |
| D296,509 S | 7/1988 | Fuke | |
| 4,801,782 A | 1/1989 | Ineson | |
| 4,827,107 A | 5/1989 | Peery | |
| 4,980,539 A * | 12/1990 | Walton | A47J 36/2461 |
| | | | 219/386 |
| 4,982,722 A | 1/1991 | Wyatt | |
| 4,983,798 A | 1/1991 | Eckler | |
| 5,042,258 A * | 8/1991 | Sundhar | A47G 19/2288 |
| | | | 62/3.2 |
| 5,090,209 A | 2/1992 | Martin | |
| 5,163,290 A | 11/1992 | Kinnear | |
| 5,199,275 A | 4/1993 | Martin | |
| 5,208,896 A | 5/1993 | Katayev | |
| 5,243,684 A | 9/1993 | Edwards | |
| 5,274,215 A | 12/1993 | Jackson | |
| 5,283,420 A | 2/1994 | Montalto | |
| 5,313,787 A | 5/1994 | Martin | |
| 5,343,368 A | 8/1994 | Miller | |
| 5,448,809 A | 9/1995 | Kraus | |
| 5,497,883 A | 3/1996 | Monetti | |
| 5,508,494 A | 4/1996 | Sarris et al. | |
| 5,550,452 A | 8/1996 | Shirai et al. | |
| 5,603,858 A | 2/1997 | Wyatt et al. | |
| 5,643,485 A | 7/1997 | Potter et al. | |
| 5,678,925 A | 10/1997 | Garmaise et al. | |
| 5,731,568 A * | 3/1998 | Malecek | B60H 1/00278 |
| | | | 180/68.5 |
| 5,737,923 A | 4/1998 | Gilley | |
| 5,786,643 A | 7/1998 | Wyatt et al. | |
| 5,842,353 A * | 12/1998 | Kuo-Liang | A47G 19/2288 |
| | | | 219/419 |
| 5,884,006 A | 3/1999 | Frohlich et al. | |
| 5,903,133 A | 5/1999 | Amero, Jr. et al. | |
| 5,948,301 A | 9/1999 | Liebermann | |
| 5,954,984 A | 9/1999 | Ablah et al. | |
| 5,959,433 A | 9/1999 | Rohde | |
| 6,005,233 A | 12/1999 | Wyatt | |
| 6,013,901 A * | 1/2000 | Lavoie | A47G 19/2227 |
| | | | 219/432 |
| 6,032,481 A | 3/2000 | Mosby | |
| 6,042,720 A | 3/2000 | Reber | |
| 6,072,161 A * | 6/2000 | Stein | A47J 36/2472 |
| | | | 219/386 |
| 6,075,229 A | 6/2000 | Vanselow | |
| 6,108,489 A | 8/2000 | Frohlich et al. | |
| 6,123,065 A | 9/2000 | Teglbjarg | |
| 6,140,614 A * | 10/2000 | Padamsee | A47J 36/2466 |
| | | | 219/438 |
| 6,144,016 A | 11/2000 | Garvin | |
| 6,180,003 B1 | 1/2001 | Reber et al. | |
| 6,212,959 B1 | 4/2001 | Perkins | |
| 6,232,585 B1 | 5/2001 | Clothier | |
| RE37,213 E | 6/2001 | Staggs | |
| 6,274,856 B1 | 8/2001 | Clothier | |
| 6,279,470 B2 | 8/2001 | Simeray et al. | |
| 6,281,611 B1 | 8/2001 | Chen et al. | |
| 6,314,867 B1 * | 11/2001 | Russell | A47J 36/2466 |
| | | | 219/432 |
| 6,316,753 B2 | 11/2001 | Clothier | |
| 6,320,169 B1 | 11/2001 | Clothier | |
| 6,350,972 B1 | 2/2002 | Wright | |
| 6,353,208 B1 | 3/2002 | Bostic | |
| 6,376,803 B1 | 4/2002 | Klinger | |
| 6,384,387 B1 | 5/2002 | Owens | |
| 6,403,928 B1 * | 6/2002 | Ford | A47J 36/2461 |
| | | | 219/386 |
| 6,414,278 B1 | 7/2002 | Frohlich et al. | |
| 6,415,624 B1 | 7/2002 | Connors et al. | |
| 6,427,863 B1 | 8/2002 | Nichols | |
| 6,433,313 B1 | 8/2002 | Owens | |
| 6,444,961 B2 | 9/2002 | Clothier | |
| 6,555,789 B2 | 4/2003 | Owens | |
| 6,571,564 B2 | 6/2003 | Upadhye et al. | |
| 6,584,374 B2 | 6/2003 | Lee et al. | |
| 6,634,417 B1 | 10/2003 | Kolowich | |
| 6,657,170 B2 | 12/2003 | Clothier | |
| 6,662,978 B2 | 12/2003 | Lin et al. | |
| 6,664,520 B2 | 12/2003 | Clothier | |
| 6,674,052 B1 * | 1/2004 | Luo | A47J 41/0077 |
| | | | 219/432 |
| 6,702,138 B1 | 3/2004 | Bielecki et al. | |
| 6,703,590 B1 | 3/2004 | Holley, Jr. | |
| 6,818,867 B2 | 11/2004 | Kressmann | |
| 6,852,954 B1 | 2/2005 | Liu et al. | |
| 6,864,462 B2 | 3/2005 | Sanoner et al. | |
| 6,870,135 B2 | 3/2005 | Hamm et al. | |
| 6,953,913 B1 | 10/2005 | Hara et al. | |
| 6,968,888 B2 | 11/2005 | Kolowich | |
| 7,002,111 B2 | 2/2006 | Bauer | |
| 7,022,946 B2 * | 4/2006 | Sanoner | A47G 19/2227 |
| | | | 219/387 |
| 7,034,256 B1 | 4/2006 | Phillips | |
| 7,059,387 B2 | 6/2006 | Kolowich | |
| 7,073,678 B1 | 7/2006 | Dibdin et al. | |
| 7,091,455 B2 | 8/2006 | Fung | |
| 7,109,445 B2 | 9/2006 | Patterson et al. | |
| 7,193,190 B2 | 3/2007 | Kissel, Jr. | |
| 7,208,707 B2 | 4/2007 | Clothier | |
| 7,212,955 B2 | 5/2007 | Kirshenbaum et al. | |
| 7,227,108 B2 | 6/2007 | Clothier | |
| 7,276,676 B1 | 10/2007 | Thompson | |
| 7,287,386 B2 | 10/2007 | Upadhye et al. | |
| 7,414,380 B2 | 8/2008 | Tang et al. | |
| 7,431,174 B2 | 10/2008 | Thissen | |
| 7,571,830 B2 | 8/2009 | Lin | |
| 7,659,493 B2 | 2/2010 | Reusche et al. | |
| 7,681,754 B1 | 3/2010 | Ross | |
| 7,683,572 B2 | 3/2010 | Toya | |
| 7,815,067 B2 | 10/2010 | Matsumoto et al. | |
| 7,825,353 B2 * | 11/2010 | Shingler | H05B 3/70 |
| | | | 126/21 A |
| 7,836,722 B2 | 11/2010 | Magill et al. | |
| 7,934,537 B2 | 5/2011 | Kolowich | |
| 7,942,145 B2 | 5/2011 | Palena et al. | |
| 7,948,209 B2 | 5/2011 | Jung | |
| 7,997,786 B2 | 8/2011 | Liu | |
| 8,055,310 B2 | 11/2011 | Beart et al. | |
| 8,076,620 B2 | 12/2011 | Maupin et al. | |
| 8,205,468 B2 | 6/2012 | Hemminger et al. | |
| 8,272,532 B2 | 9/2012 | Michaelian et al. | |
| 8,274,016 B2 | 9/2012 | Montana | |
| 8,280,453 B2 | 10/2012 | Beart et al. | |
| 8,319,154 B2 | 11/2012 | Shaikh et al. | |
| 8,336,729 B2 | 12/2012 | Kelly et al. | |
| 8,400,104 B2 | 3/2013 | Adamczyk et al. | |
| 8,448,809 B2 | 5/2013 | Kelly | |
| 8,467,669 B2 * | 6/2013 | Widanagamage Don | A47J 27/2105 |
| | | | 119/229 |
| 8,479,941 B2 | 7/2013 | Matsumoto et al. | |

(56) References Cited

U.S. PATENT DOCUMENTS

| | | | |
|---|---|---|---|
| 8,618,448 B2 * | 12/2013 | Alexander | A47G 19/2288 165/58 |
| 8,759,721 B1 | 6/2014 | Alexander | |
| 8,907,796 B2 | 12/2014 | Sweeney et al. | |
| 9,035,222 B2 * | 5/2015 | Alexander | 165/58 |
| 9,151,545 B2 * | 10/2015 | Soukhojak | C09K 5/04 |
| 9,184,427 B2 * | 11/2015 | Chuang | H01M 2/105 |
| 2001/0023866 A1 | 9/2001 | Wang | |
| 2002/0023912 A1 * | 2/2002 | McGee | A47J 36/2461 219/432 |
| 2002/0162339 A1 | 11/2002 | Harrison | |
| 2002/0175158 A1 | 11/2002 | Sanoner et al. | |
| 2003/0024250 A1 | 2/2003 | Haas | |
| 2003/0029662 A1 | 2/2003 | Piech | |
| 2003/0029862 A1 | 2/2003 | Clothier | |
| 2003/0066638 A1 | 4/2003 | Ou | |
| 2003/0145621 A1 | 8/2003 | Kidwell | |
| 2004/0004072 A1 | 1/2004 | Clothier | |
| 2004/0167592 A1 | 8/2004 | Grove | |
| 2004/0194470 A1 | 10/2004 | Upadhye et al. | |
| 2005/0045615 A1 | 3/2005 | Sanoner et al. | |
| 2005/0121431 A1 | 6/2005 | Yuen | |
| 2005/0242804 A1 | 11/2005 | Hintz | |
| 2006/0023480 A1 | 2/2006 | Plummer | |
| 2006/0081599 A1 | 4/2006 | Anderson | |
| 2006/0207442 A1 * | 9/2006 | Pettersson | F25B 21/02 99/517 |
| 2006/0261233 A1 | 11/2006 | Williams et al. | |
| 2007/0092773 A1 | 4/2007 | Guo | |
| 2007/0151457 A1 | 7/2007 | Rabin et al. | |
| 2007/0182367 A1 | 8/2007 | Partovi | |
| 2007/0223895 A1 | 9/2007 | Flemm | |
| 2007/0278207 A1 | 12/2007 | Van Hoy | |
| 2007/0279002 A1 | 12/2007 | Partovi | |
| 2008/0011077 A1 | 1/2008 | Ramus et al. | |
| 2008/0019122 A1 | 1/2008 | Kramer | |
| 2008/0022695 A1 | 1/2008 | Welle | |
| 2008/0022696 A1 | 1/2008 | Welle | |
| 2008/0041859 A1 | 2/2008 | Teglbjarg | |
| 2008/0135564 A1 | 6/2008 | Romero | |
| 2008/0141681 A1 | 6/2008 | Arnold | |
| 2008/0149624 A1 | 6/2008 | Tamura | |
| 2008/0179311 A1 | 7/2008 | Koro et al. | |
| 2008/0213449 A1 | 9/2008 | Wisner et al. | |
| 2008/0251063 A1 | 10/2008 | Palena et al. | |
| 2008/0272134 A1 | 11/2008 | Rohe | |
| 2009/0102296 A1 | 4/2009 | Greene et al. | |
| 2009/0166350 A1 | 7/2009 | Ho | |
| 2009/0184102 A1 | 7/2009 | Parker, Jr. et al. | |
| 2009/0230117 A1 | 9/2009 | Fernando | |
| 2010/0000980 A1 | 1/2010 | Popescu | |
| 2010/0028758 A1 * | 2/2010 | Eaves | H01M 2/105 429/50 |
| 2010/0108694 A1 | 5/2010 | Sedlbauer et al. | |
| 2010/0125417 A1 | 5/2010 | Hyde et al. | |
| 2010/0158489 A1 | 6/2010 | Siu et al. | |
| 2010/0186499 A1 | 7/2010 | Ramus et al. | |
| 2011/0056215 A1 | 3/2011 | Ham et al. | |
| 2011/0062149 A1 | 3/2011 | Driel et al. | |
| 2011/0072978 A1 * | 3/2011 | Popescu | A47G 19/14 99/288 |
| 2011/0121660 A1 | 5/2011 | Azancot et al. | |
| 2011/0152979 A1 | 6/2011 | Driscoll et al. | |
| 2011/0155621 A1 | 6/2011 | Lindquist et al. | |
| 2011/0174993 A1 | 7/2011 | Blain | |
| 2011/0180527 A1 | 7/2011 | Abbott | |
| 2011/0198255 A1 | 8/2011 | Baumfalk et al. | |
| 2011/0259871 A1 | 10/2011 | Li | |
| 2011/0265562 A1 | 11/2011 | Li | |
| 2012/0061050 A1 | 3/2012 | Petrillo et al. | |
| 2012/0064470 A1 | 3/2012 | Delattre et al. | |
| 2012/0082766 A1 * | 4/2012 | Maupin | A47J 27/004 426/244 |
| 2012/0090333 A1 | 4/2012 | DellaMorte et al. | |
| 2012/0103562 A1 | 5/2012 | Alexander | |
| 2012/0118874 A1 | 5/2012 | Williams et al. | |
| 2012/0132646 A1 | 5/2012 | England et al. | |
| 2012/0138597 A1 | 6/2012 | Quella et al. | |
| 2012/0193999 A1 | 8/2012 | Zeine | |
| 2012/0235505 A1 | 9/2012 | Schatz et al. | |
| 2012/0235636 A1 | 9/2012 | Partovi | |
| 2012/0248095 A1 | 10/2012 | Lee et al. | |
| 2012/0248096 A1 | 10/2012 | Lee et al. | |
| 2012/0255946 A1 | 10/2012 | Kim et al. | |
| 2012/0256585 A1 | 10/2012 | Partovi et al. | |
| 2012/0258229 A1 | 10/2012 | Mindrup | |
| 2012/0319500 A1 | 12/2012 | Beart et al. | |
| 2013/0103463 A1 | 4/2013 | Briar et al. | |
| 2013/0167730 A1 | 7/2013 | Behm | |
| 2013/0200064 A1 * | 8/2013 | Alexander | A47G 19/2288 219/441 |
| 2013/0206015 A1 | 8/2013 | Jacoby et al. | |
| 2013/0221013 A1 | 8/2013 | Kolowich et al. | |
| 2013/0239607 A1 | 9/2013 | Kelly | |
| 2013/0255824 A1 | 10/2013 | Williams et al. | |
| 2013/0275075 A1 | 10/2013 | Johnson | |
| 2013/0287967 A1 | 10/2013 | Alexander | |
| 2014/0165607 A1 | 6/2014 | Alexander | |
| 2014/0230484 A1 | 8/2014 | Yavitz | |
| 2014/0238985 A1 | 8/2014 | Sweeney et al. | |
| 2014/0305927 A1 | 10/2014 | Alexander | |
| 2015/0024349 A1 | 1/2015 | Bischoff | |
| 2015/0122688 A1 | 5/2015 | Dias | |
| 2015/0245723 A1 | 9/2015 | Alexander | |
| 2015/0335184 A1 | 11/2015 | Balachandran | |
| 2016/0183730 A1 * | 6/2016 | Bedi | A47G 19/2288 219/439 |
| 2017/0150840 A1 * | 6/2017 | Park | A47J 27/002 |

FOREIGN PATENT DOCUMENTS

| | | |
|---|---|---|
| CN | 1748112 A | 3/2006 |
| CN | 1776992 A | 5/2006 |
| CN | 2922666 Y | 7/2007 |
| CN | 101069606 A | 11/2007 |
| CN | 201042350 Y | 4/2008 |
| CN | 201042350 Y | 4/2008 |
| CN | 201076180 | 6/2008 |
| CN | 201308643 | 10/2008 |
| CN | 201237271 | 5/2009 |
| CN | 201303850 Y | 9/2009 |
| CN | 201445353 U | 5/2010 |
| CN | 101820128 A | 9/2010 |
| CN | 201612420 U | 10/2010 |
| CN | 102802294 | 5/2012 |
| CN | 202681700 | 1/2013 |
| CN | 202919767 U | 5/2013 |
| CN | 102266184 B | 10/2013 |
| CN | 203468187 U | 3/2014 |
| DE | 19744526 | 4/1999 |
| DE | 20108363 | 8/2001 |
| DE | 20314416 | 1/2004 |
| EP | 0332355 | 9/1989 |
| EP | 0722708 | 7/1996 |
| EP | 0895772 | 2/1999 |
| EP | 2 165 243 | 3/2010 |
| EP | 2001761 | 1/2012 |
| EP | 2308771 | 6/2012 |
| FR | 2737380 | 1/1997 |
| FR | 2752377 | 2/1998 |
| FR | 2763463 | 11/1998 |
| FR | 2828082 | 2/2003 |
| GB | 2 390 798 A | 1/2004 |
| GB | 2441825 | 3/2008 |
| JP | U-S54-147575 | 4/1953 |
| JP | 11-268777 | 10/1999 |
| JP | 2000-279302 A | 10/2000 |
| JP | 2003-299255 A | 10/2003 |
| JP | A-2004-261493 | 9/2004 |
| JP | 2006-345957 | 6/2005 |
| JP | 2006-068152 | 3/2006 |
| JP | 2006-102234 A | 4/2006 |
| JP | 2006-166522 A | 6/2006 |

(56) References Cited

FOREIGN PATENT DOCUMENTS

| JP | 2007-064557 A | 3/2007 |
|---|---|---|
| JP | 2007-312932 | 12/2007 |
| JP | 2008-173464 A | 7/2008 |
| JP | U-3153007 | 7/2009 |
| JP | 2010-527226 A | 8/2010 |
| JP | 2011-171205 | 9/2011 |
| JP | 5127819 | 1/2013 |
| JP | 5481388 | 4/2014 |
| WO | WO 2004/055654 A2 | 7/2004 |
| WO | WO 2008/028329 | 3/2008 |
| WO | WO 2008/065175 | 6/2008 |
| WO | WO 2008/137996 A1 | 11/2008 |
| WO | WO 2008/155538 A2 | 12/2008 |
| WO | WO 2009/138930 A1 | 11/2009 |
| WO | WO 2012/104665 | 8/2012 |
| WO | WO 2014/158655 A2 | 10/2014 |

OTHER PUBLICATIONS

Decision of Rejection dated Apr. 4, 2017 in JP Application No. 2013-537797.
European Patent Office Search Report dated Mar. 17, 2016 regarding Application No. 11838764.6-1804, PCT/US2011059014, 7 pages.
First Office Action dated Nov. 23, 2016 in CN Application No. 201480014620.9.
International Preliminary Report on Patentability dated May 7, 2013 in PCT Application No. PCT/US2011/059014.
International Search Report and Written Opinion dated Jan. 12, 2016 in PCT Application No. PCT/US15/36304.
International Search Report and Written Opinion dated Dec. 9, 2014 in PCT/US2014/019130.
International Search Report and Written Opinion dated Mar. 16, 2012 in PCT/US2011/059014.
Non-final Office Action dated Nov. 14, 2016 in U.S. Appl. No. 15/050,714.
Non-final office action dated Aug. 2, 2016 in Japanese Patent Application No. 2013-537797.
Notice of Reason(s) for Rejection dated Aug. 11, 2015 in JP Application No. 2013-53797.
Office Action in related Chinese Application No. 201180063844.5, dated Dec. 29, 2014.
Patent Examination Report No. 1 in related Australian Application No. 2011323416, dated May 15, 2015.
Patent Examination Report No. 2 in related Australian Application No. 2011323416, dated Oct. 20, 2015.
Supplementary European Search Report dated Oct. 18, 2016 in European Patent Application No. 14774350.4.
International Search Report and Written Opinion dated Aug. 17, 2017 in PCT Application No. PCT/US2017/032020.

* cited by examiner

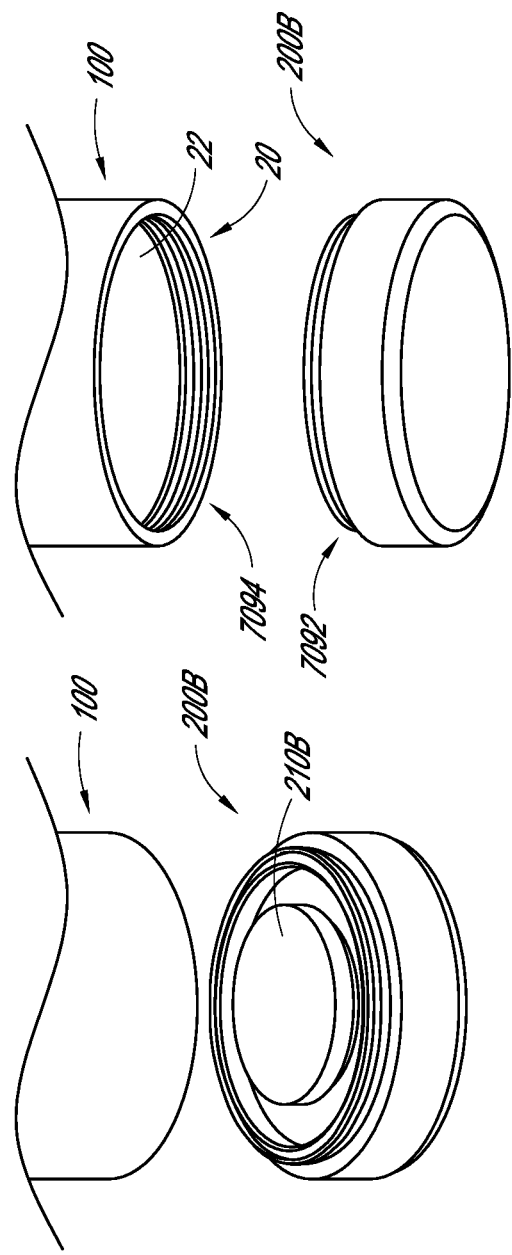

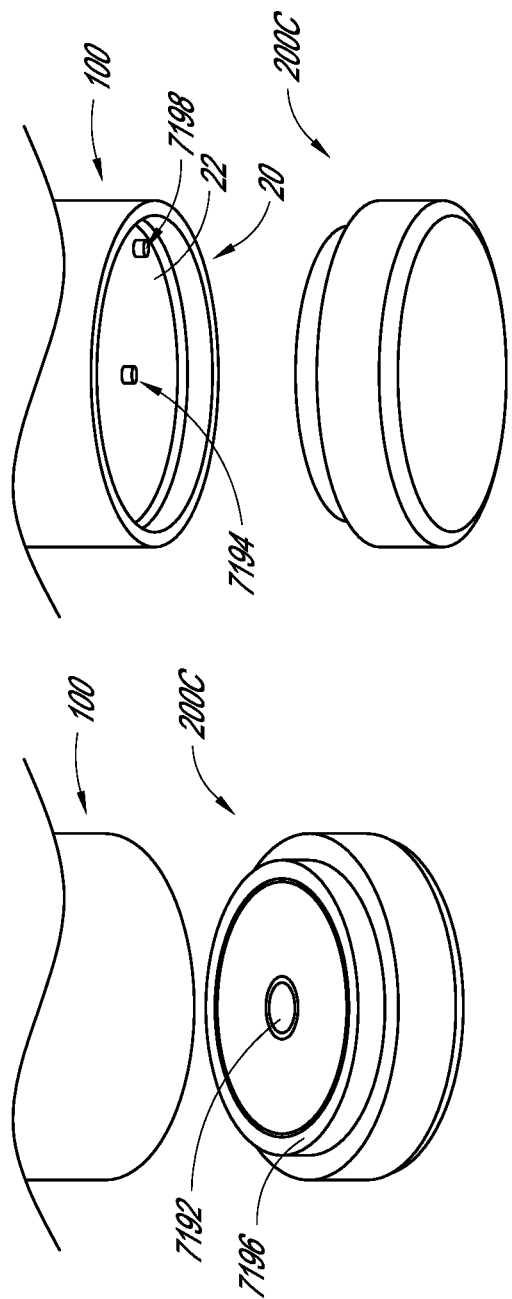

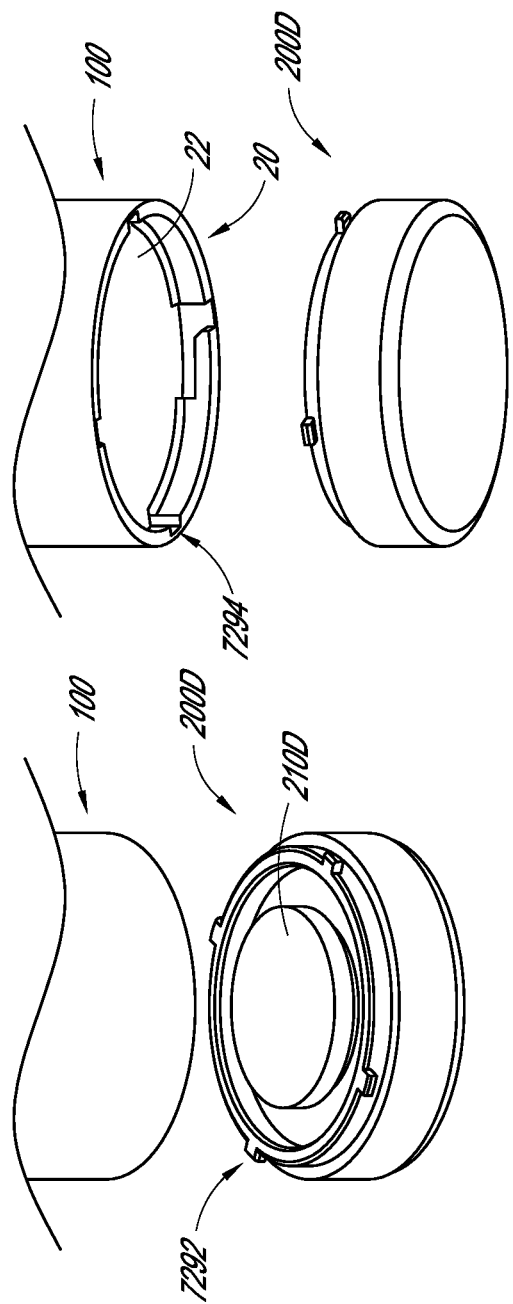

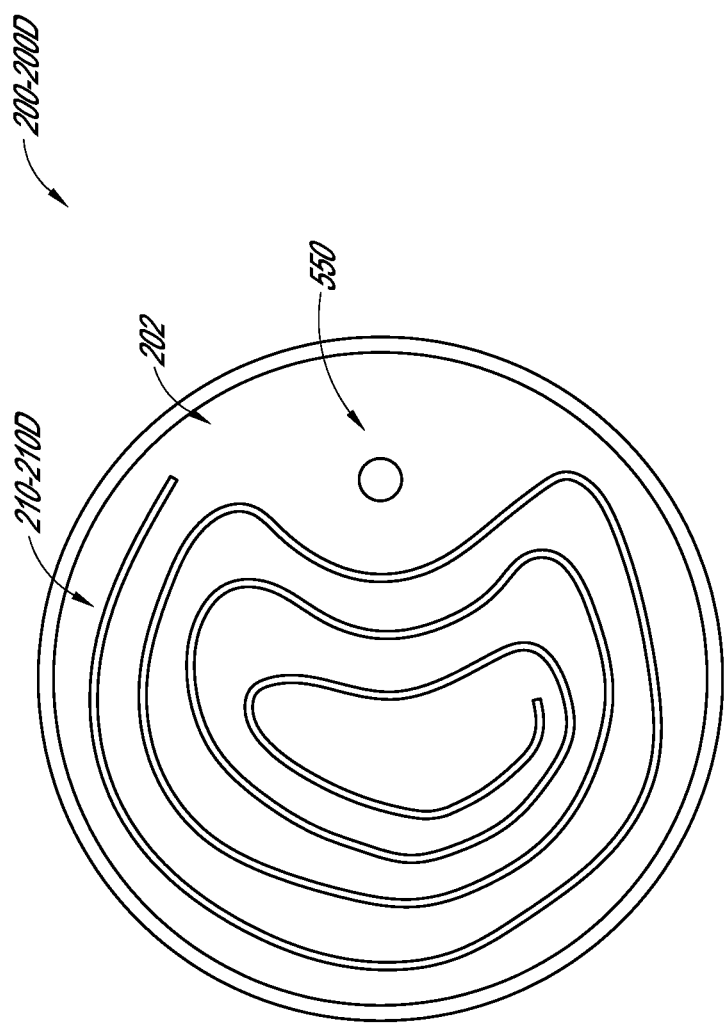

DRINKWARE AND PLATEWARE AND ACTIVE TEMPERATURE CONTROL MODULE FOR SAME

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. This application claims priority to U.S. Provisional Application No. 62/335,443, filed May 12, 2016, the entire contents of which are hereby incorporated by reference and should be considered a part of this specification. This application is related to U.S. application Ser. No. 14/712,313, filed May 14, 2015, the entire contents of all of which are hereby incorporated by reference and should be considered a part of this specification.

BACKGROUND

Field

The present invention is directed to a drinkware or plateware device, and more particularly to a drinkware or plateware device with a detachable active temperature control module used to heat or cool contents thereof.

Description of the Related Art

Ceramic mugs, used for example to drink coffee and tea, are well known and used at home, in restaurants and cafes. However, conventional ceramic mugs do not allow the beverage to remain hot throughout the beverage drinking process, so that the liquid temperature decreases during consumption of the beverage. Ceramic mugs also have poor thermal conductivity, making common ceramic mugs unsuitable for use with a heating unit (e.g., to try to heat the liquid in the mug to maintain it in a heated state during the drinking process).

SUMMARY

There is a need for a detachable active temperature control module that can be used with drinkware and plateware devices (such as a mug or plate) for heating or cooling the contents thereof (e.g., coffee, tea, water, food) that is easy to use and that can optionally communicate with electronics (e.g., smartphones) to allow easy operation of the module. Additionally there is a need for a module that can be easily attached to and detached from the drinkware and plateware device to allow the device to be washed without risking damage to the electronics in the module. Further, there is also a need for a module that can be used with existing plateware and drinkware devices (e.g., existing plates or mugs) in a user's kitchen. There is also a need for a module that can be used with a plurality of mugs (e.g., at a café) operable to maintain a drinking temperature of a beverage in a mug for an extended period of time (e.g., while the user is in the café) to improve the customer experience.

In accordance with one aspect, a beverage container system is provided. The system comprises a container made of metal and having a body with an open top end, a circumferential wall and a base at a bottom end, the body having a chamber defined by the circumferential wall and base of the body. The system also comprises a temperature control module removably coupleable to the bottom end of the container. The module comprises at least one heating or cooling element configured to be placed in thermal communication with the base of the body when the module is coupled to the container to thereby heat or cool at least a portion of the chamber, control circuitry configured to control operation of the one or more heating or cooling elements, at least one power storage element configured to provide power to one or both of the control circuitry and the at least one heating or cooling element, and one or both of a wireless transmitter configured to transmit information of the module to a remote electronic device and a wireless receiver configured to receive information from the remote electronic device.

In accordance with another aspect, a temperature control module removably coupleable to a beverage container is provided. The module comprises at least one heating or cooling element configured to be placed in thermal communication with a surface of the container when the module is coupled to the container to thereby heat or cool at least a portion of a chamber of the container. The module also comprises at least one temperature sensor configured to contact a surface of the container when the module is coupled to the container, the at least one temperature sensor configured to sense a parameter indicative of a temperature of contents in the container, control circuitry configured to control operation of the one or more heating or cooling elements, at least one power storage element configured to provide power to one or both of the control circuitry and the at least one heating or cooling element, and one or both of a wireless transmitter configured to transmit information of the module to a remote electronic device and a wireless receiver configured to receive information from the remote electronic device.

In accordance with another aspect, a temperature control module removably coupleable to a plateware device is provided. The module comprises at least one heating or cooling element configured to be placed in thermal communication with a surface of the plateware device when the module is coupled to the plateware device to thereby heat or cool foodstuff on the plateware device. The module also comprises a heat transfer pack that protrudes form an upper surface of the module and is in thermal communication with the at least one heating or cooling element, control circuitry configured to control operation of the one or more heating or cooling elements, at least one power storage element configured to provide power to one or both of the control circuitry and the at least one heating or cooling element, and one or both of a wireless transmitter configured to transmit information of the module to a remote electronic device and a wireless receiver configured to receive information from the remote electronic device. The heat transfer pack is configured to thermally communicate the at least one heating or cooling element with a bottom surface of the plateware device when the plateware device is disposed on the module.

In accordance with one aspect, an actively heated beverage container system is provided. The system comprises a container made of metal and having a body with an open top end, a circumferential wall and a base at a bottom end, the body having a chamber defined by the circumferential wall and base of the body. The system also comprises a temperature control module comprising at least one heating element in thermal communication with a surface of the body to heat at least a portion of the chamber, control circuitry configured to control operation of the one or more heating elements, at least one power storage element configured to provide power to one or both of the control circuitry and the at least one heating element, and one or both of a wireless transmitter configured to transmit information of the module to a remote electronic device and a wireless receiver configured to receive information from the remote electronic device. Optionally, the at least one heating element is in thermal communication with the base of the body. Optionally, the at least one heating element is in thermal communication with the circumferential wall of the body. Optionally, the at least one heating element is in thermal communication with the base and the circumferential wall of the body.

In accordance with another aspect, an actively heated beverage container system is provided. The system comprises a container made of metal and having a body with an open top end, a circumferential wall and a base at a bottom end, the body having a chamber defined by the circumferential wall and base of the body. The system also comprises a temperature control module comprising at least one heating element in thermal communication with a surface of the body to heat at least a portion of the chamber, control circuitry configured to control operation of the at least one heating element, at least one power storage element configured to provide power to one or both of the control circuitry and the at least one heating element, one or both of a wireless transmitter configured to transmit information to a remote electronic device and a wireless receiver configured to receive information from the remote electronic device, and a visual indicator on an outer surface of the container that can be lit in one of a plurality of colors selected by a user via the remote electronic device to identify the container. Optionally, the at least one heating element is in thermal communication with the base of the body. Optionally, the at least one heating element is in thermal communication with the circumferential wall of the body. Optionally, the at least one heating element is in thermal communication with the base and the circumferential wall of the body.

BRIEF DESCRIPTION OF THE DRAWINGS

FIG. 5A-5B show a top perspective and bottom perspective view of another embodiment of an active temperature control module.

FIG. 6A-6B show a top perspective and bottom perspective view of another embodiment of an active temperature control module.

FIG. 7A-7B show a top perspective and bottom perspective view of another embodiment of an active temperature control module.

FIG. 13 shows a schematic view of a heat transfer element arrangement of the active temperature control module.

DETAILED DESCRIPTION

Figure 1:
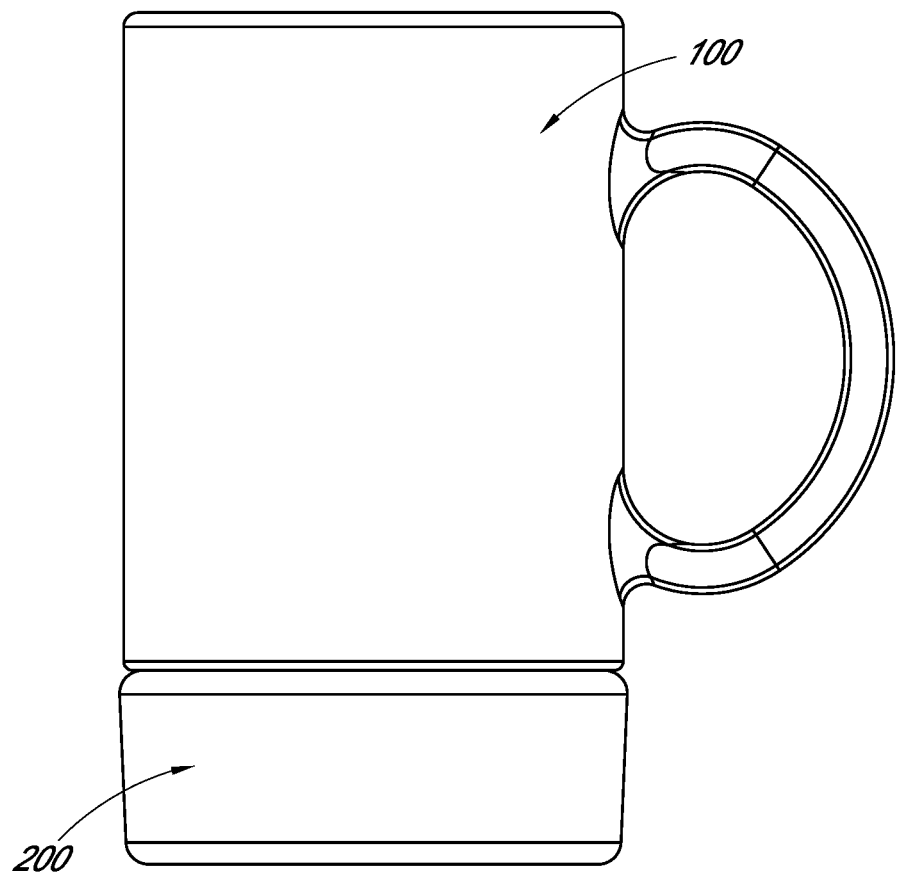
FIG. 1 is a perspective front view of one embodiment of a mug with an active temperature control module attached to a bottom of the mug.
Figure 2:
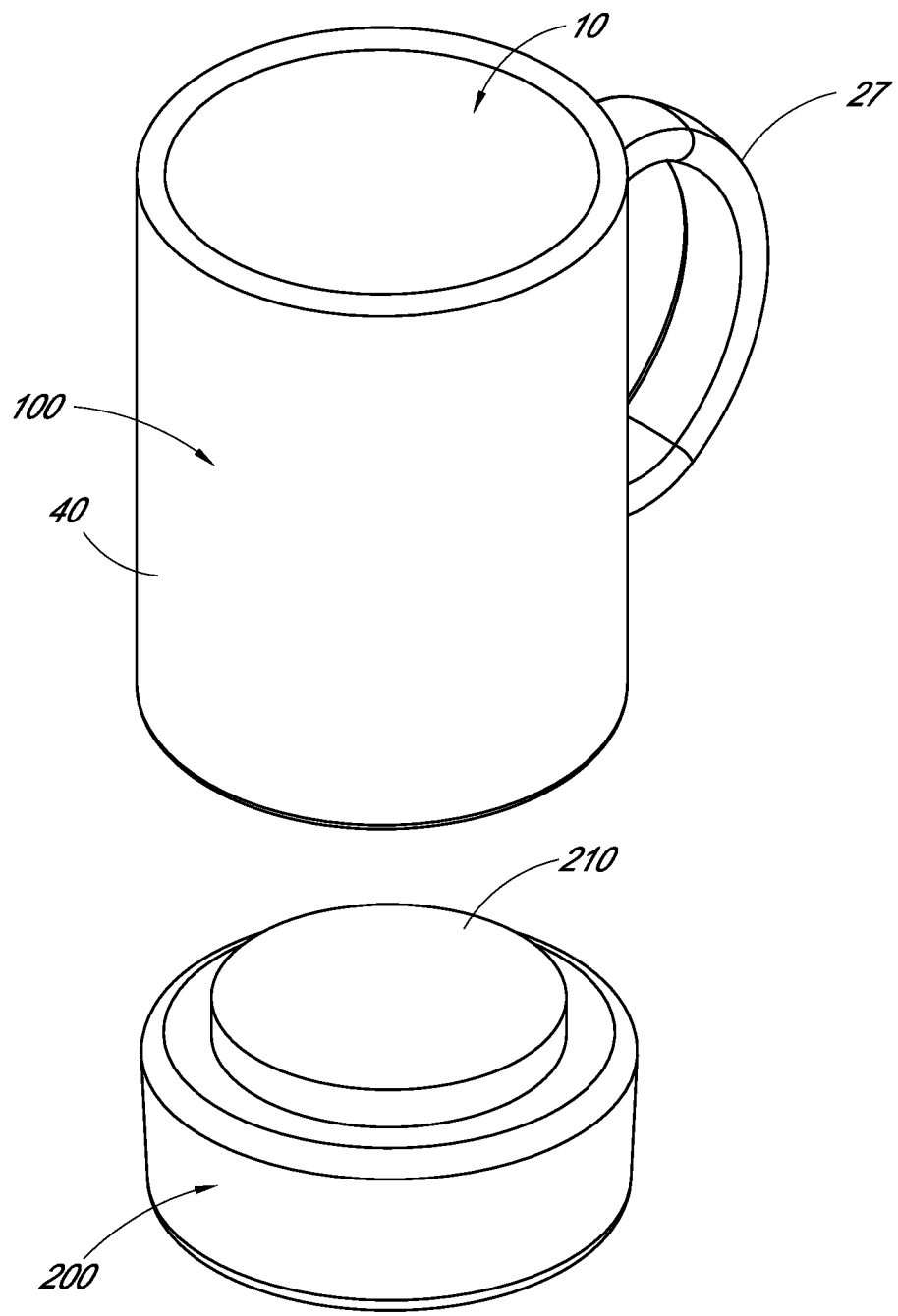
FIG. 2 is a perspective exploded view of the mug and active temperature control module of FIG. 1 when detached.
Figure 3:
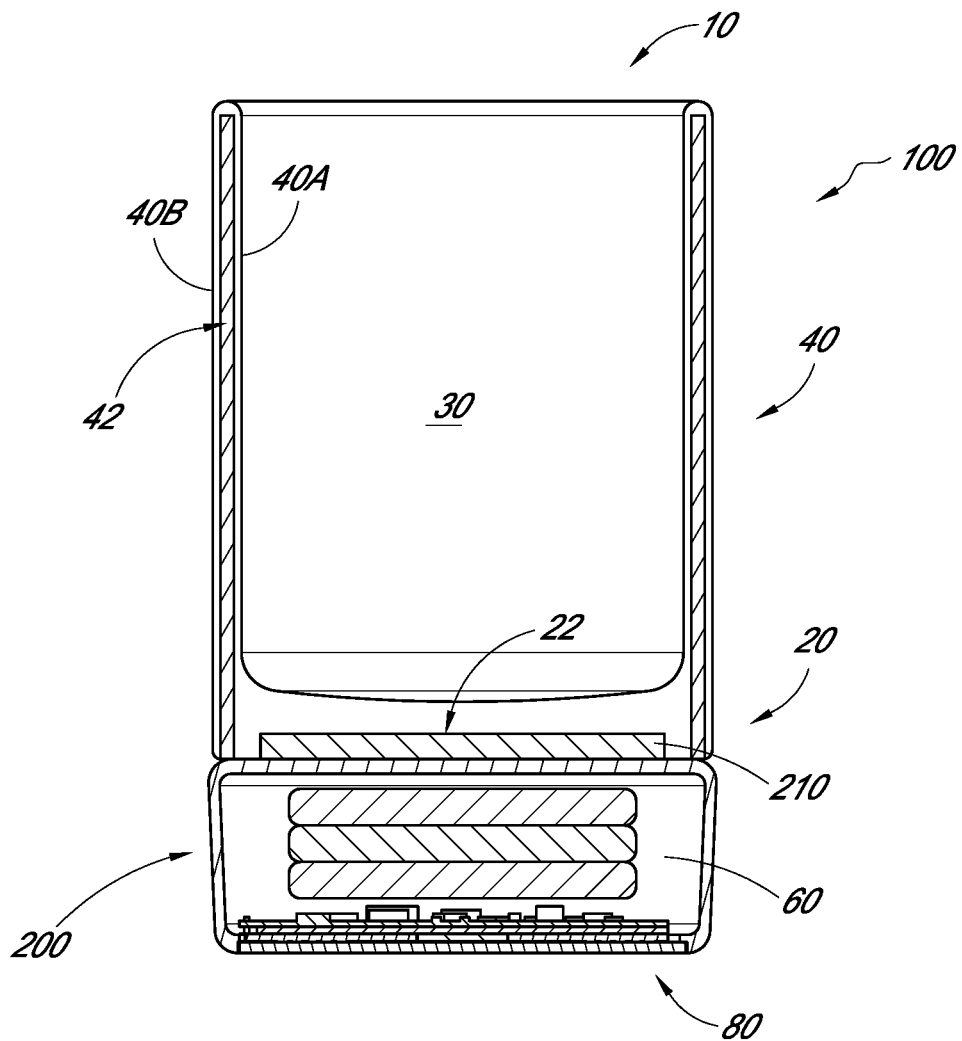
FIG. 3 is a cross-sectional view of the mug and active temperature control module of FIG. 1.

FIGS. 1-3 show one embodiment of a drinkware container (e.g., mug) 100 and active temperature control module 200. The temperature control module 200 can advantageously operate during at least a period of time (e.g., a portion of the period of time) during which the module 200 is attached to the container 100 to increase or decrease or maintain a temperature of a liquid in the container 100. Accordingly, the term "active", as used herein, is not limited to continuous operation of the module 200 while it is attached to the container 100. As used herein, heat transfer encompasses a heating, as well as a cooling, process. Therefore, a "heat transfer element" as used herein is an element that can effect a heating or a cooling process.

In the illustrated embodiment, the container 100 can look like a typical ceramic mug with an open top end 10, a base or closed (e.g., flat) bottom end 20 having a bottom surface 22, and a cavity or chamber 30 defined by a circumferential wall 40 and the base 20. Optionally, the container 100 can have a handle 27.

Preferably, the base 20 and circumferential wall 40 of the mug 100 are made of a thermally conductive material, such as a metal (e.g., stainless steel). In one embodiment, the mug 100 is double walled, where the circumferential wall 40 is defined by an inner wall 40a and an outer wall 40b that is spaced apart from the inner wall 40a to define a chamber 42 therebetween. In one embodiment, the base 20 is single walled with a thickness of between about 0.2 mm and about 13 mm, in some embodiments about 0.3 mm.

The outer wall 40b of the mug 100 can be coated with a ceramic material so that the mug 100 looks like a conventional ceramic mug. The ceramic material can allow the mug 100 to be coated with text and or logos, in the same manner conventional mugs are.

In one embodiment, the chamber 42 can optionally be filled with an insulative material. The insulative material can advantageously enhance the thermal properties of the mug 100 by inhibiting heat loss through the circumferential wall 40. Additionally, the insulative material can reduce or inhibit the metallic sound of the mug 100 (e.g., ceramic coated mug), allowing the mug 100 to sound similar to a conventional ceramic mug.

With continued reference to FIGS. 1-3, the module 200 (e.g., a heating module, a cooling module, a heating/cooling module) can optionally include one or more of heat transfer elements 210 (e.g., heating elements or cooling elements or heating/cooling elements, such as thermoelectric or Peltier elements), one or more power storage element 60 and/or control circuitry 80. The module 200 can removably couple to the bottom portion of the container 100 so that the one or more heat transfer elements 210 is in contact with the bottom end 20 (e.g., the bottom surface 22) of the container 100. In the illustrated embodiment, there are no electronics (e.g., batteries, sensors, heating/cooling elements) in the container 100; all electronics and the one or more heat transfer elements 210 are in the module 200. Advantageously, this allows the container 100 to be readily washed (e.g., hand washed or in a dishwasher), once the container 100 is decoupled from the module 200, without worrying about possible damage to electronics.

In another embodiment, the one or more heat transfer elements can be incorporated into the container 100, such as into the base 20 of the container 100 (as disclosed in other embodiments herein), and power to the one or more heat transfer elements can be communicated from the module 200 via one or more electrical contacts between the container 100 and the temperature control module 200.

Figures 4A, 4B:
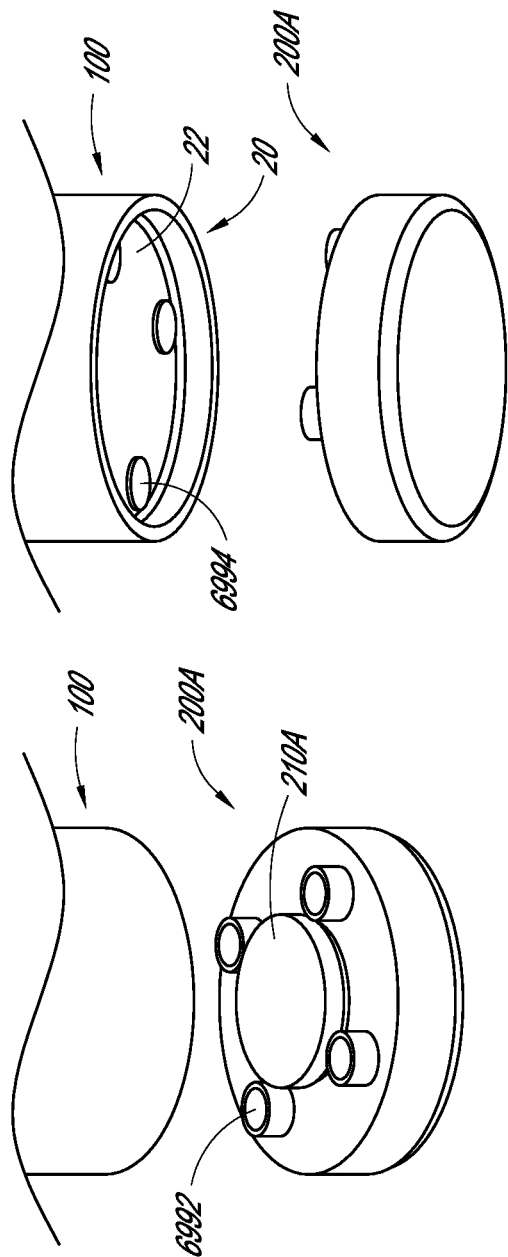
FIG. 4A-4B show a top perspective and bottom perspective view of another embodiment of an active temperature control module.

FIGS. 4A-4B show one embodiment of a module 200A, which is similar to the temperature control module 200 described above, except as noted below. The module 200A can have one or more magnets 6992 configured to magnetically couple to the bottom end 20 (e.g., bottom surface 22) of the container 100 (e.g., couple to one or more magnets 6994 on the bottom surface 22) to couple the module 200A to the container 100 so that one or more heat transfer elements 210A contact the bottom end 20, such as the bottom surface 22, of the container 100. Once the user is done using the module 200A (e.g., to heat or cool a liquid in the container 100), the user can decouple the module 200A from the container 100 (e.g., to allow the container 100 to be washed).

FIGS. 5A-5B show one embodiment of a module 200B, which is similar to the temperature control module 200 described above, except as noted below. The module 200B can removably couple to the bottom end 20 of the container 100 so that the one or more heat transfer elements 210B contact the bottom end 20 (e.g., contact the bottom surface 22). The module 200B can have a threaded portion 7092 that can threadably couple to a threaded portion 7094 on the bottom end 20 of the container 100 to couple the module 200B to the container 100. Once the user is done using the module 200B (e.g., to heat a liquid in the container 100), the user can decouple the module 200B from the container 100 (e.g., to allow the container 100 to be washed).

FIGS. 6A-6B show one embodiment of a module 200C, which is similar to the temperature control module 200 described above, except as noted below. The module 200C can removably couple to the bottom end 20 of the container 100 (e.g., in a press-fit manner, using one or more magnets, etc.) so that the one or more heat transfer elements of the module 200C contact the bottom end 20 (e.g., contact the bottom surface 22) of the container 100. In another embodiment, the one or more heat transfer elements (e.g., a heating element, such as a resistive heater) can be incorporated into the container 100, and power to the one or more heat transfer elements can be communicated from the module 200C via one or more electrical contacts 7192 of the container 100. Additionally, power can be provided to one or more sensors (e.g., temperature sensors, capacitance sensors, tilt sensors) in the container 100 via an electrical contact 7196 in the module 200C that contacts an electrical contact 7198 in the container 100 when the module 200C is coupled to the container 100. In such an embodiment, the bottom end 20 (e.g., bottom surface 22) of the container 100 can be an insulated surface and the one or more heat transfer elements and one or more sensors can be water sealed in the container 100. In one embodiment, the one or more of the electrical contacts 7192, 7194, 7196, 7198 can be pogo pins or contact springs, or other suitable electrical connectors. Advantageously, if the module 200C was separated from the bottom end 20 of the container 100, the one or more heat transfer elements would remain in the container 100 and be inaccessible to the user, thereby inhibiting injuries (e.g., burns) to the user if the module 200C is decoupled from the container 100 while in operation.

FIGS. 7A-7B show one embodiment of a module 200D, which is similar to the temperature control module 200 described above, except as noted below. The module 200D can have a pin portion 7292 that can couple to a notched or recessed portion 7294 on the bottom end 20 of the container 100 to couple the module 200D to the container 100 in a twist-lock manner (e.g., by inserting the module 200D into the bottom end of the container 100 and rotating the module 200D, for example a quarter turn, to lock the module 200D to the container 100) so that the one or more heat transfer elements 210D contact the bottom end 20 (e.g., contact the bottom surface 22) of the container 100. Once the user is done using the module 200D (e.g., to heat a liquid in the container 100), the user can decouple the module 200D from the container 100 (e.g., to allow the container 100 to be washed).

In one embodiment, actuation of the one or more heat transfer elements (e.g., heat transfer elements 210-210D) can begin automatically upon the coupling of the module 200-200D to the container 100. For example, one or more sensors can sense when the module 200-200D couples to the container 100 and communicate a signal to control circuitry 80 in the module 200-200D to provide power to the one or more heat transfer elements 210-210D to heat or cool the contents in the container 100. Conversely, actuation of the one or more heat transfer elements 210-210D can cease automatically upon decoupling of the module 200-200D from the container 100 (e.g., based on sensed information from one or more sensors that the module 200-200D is not coupled to the container 100. Such one or more sensors can include a pressure sensor, a contact sensor, a capacitance sensor, an optical sensor, or any other suitable type of sensor for sensing the coupling or decoupling of the module 200-200D with the container 100.

The control circuitry 80 can control the operation of the one or more heat transfer elements 210-210D to control the amount of energy supplied to the liquid in the chamber of the container 100 to maintain or increase or decrease the temperature of the liquid. Optionally, the control circuitry 80 can control delivery of power to the one or more heat transfer elements 210-210D based at least in part on information from one or more sensors that sense a parameter of quality of the liquid (e.g., temperature, volume, level, acidity, pH) where said one or more sensors can be on a surface of one or both of the module 200-200D and container 100. For example, such sensors can be on the bottom surface 22 of the container 100 and/or the top surface of the module 200-200D.

The control circuitry 80 can include a memory that stores or receives one or more algorithms (e.g., wirelessly via a tablet or smartphone app, via a wired connection or during manufacturing of the module 200-200D at the factory) that can be executed by the control circuitry 80 to control the operation of the one or more heat transfer elements 210-210D and/or to determine a parameter of the liquid based on sensed information. In one embodiment, such algorithms can be used to determine one or more parameters of the liquid in the container 100 based on sensed information for another parameter of the liquid. In one embodiment, the container 100 can include one or more sensors in communication with inner liquid holding chamber 30 (e.g., in contact with the circumferential sidewall 40 or base 20, whose sensed information can provide an indication of a temperature of the liquid in the container 100, and an algorithm can calculate a volume of the liquid in the chamber based on the sensed information of the same sensor. For example, by sensing how long it takes for the liquid to change temperature upon actuation of the one or more heat transfer elements 210-210D, the algorithm can calculate the approximate volume of liquid in the chamber (e.g., if the container 100 is full of liquid, it may take X seconds for the sensed temperature to change, but if the container 100 is half-full of liquid, it may take Y seconds for the sensed temperature to change). Though such algorithms are described in connection with the container 100, one of skill in the art will recognize that such algorithms can be implemented or use by the control circuitry 80 of other drinkware, dishware and serverware devices as disclosed herein.

The sensed temperature can be communicated to the control circuitry 80, which can then adjust the amount of power supplied to the one or more heat transfer elements 210-210D based on the sensed temperature (e.g., the control circuitry can reduce power to the one or more heat transfer elements 210-210D as the desired temperature for the liquid is approached). Additionally, the control circuitry 80 can control the operation of the one or more heat transfer elements 210-210D based on preselected temperature (e.g., user selected temperature, such as one provided by the user directly via a user interface on the module 200-200D, or wirelessly via a tablet or smartphone app), or based on a predetermined temperature set point (e.g., temperature set point saved into a memory of the control circuitry 80, either by a user, such as via a tablet or smartphone app, or at the factory during manufacture). The control circuitry 80 can advantageously control the amount of power supplied to the one or more heat transfer elements 210-210D to prevent the temperature of the liquid from increasing above the predetermined or preselected temperature. For example, in one embodiment, the control circuitry 80 can include a temperature sensitive switch, which can open if the sensed temperature of the liquid in the container 100 increases above a temperature set point, thereby cutting off power supply to the one or more heat transfer elements 210-210D.

Figure 8:
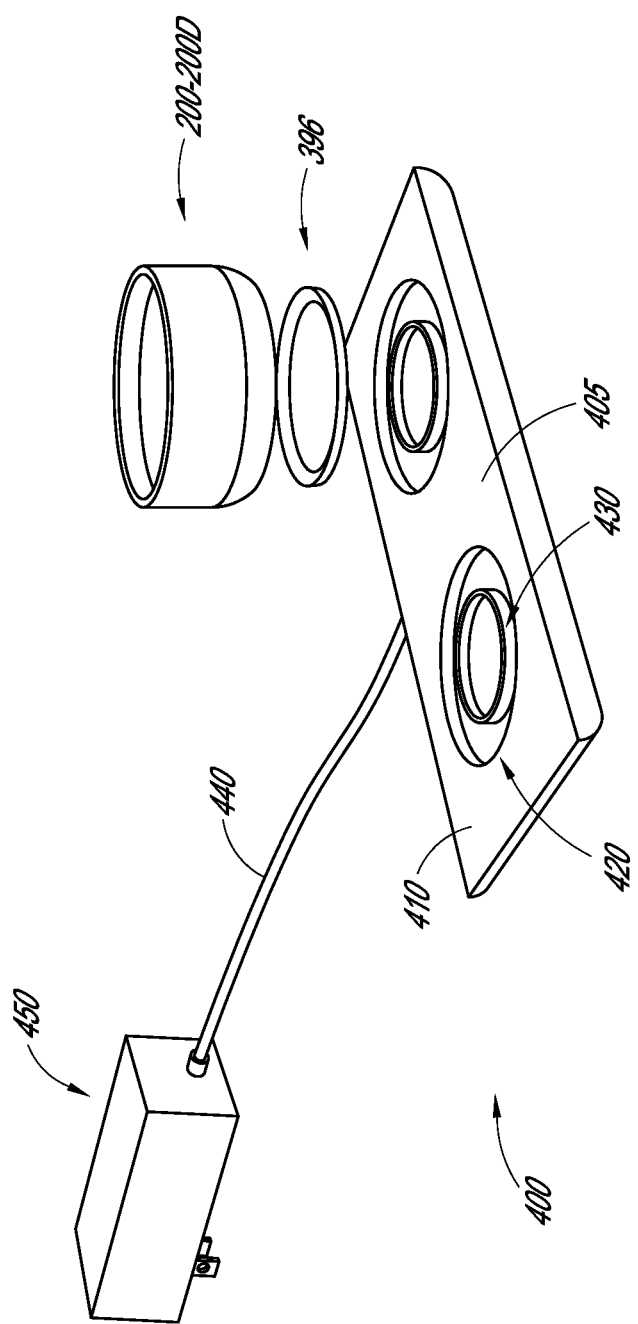
FIG. 8 shows one embodiment of a charging assembly for use with an active temperature control module.
Figure 9:
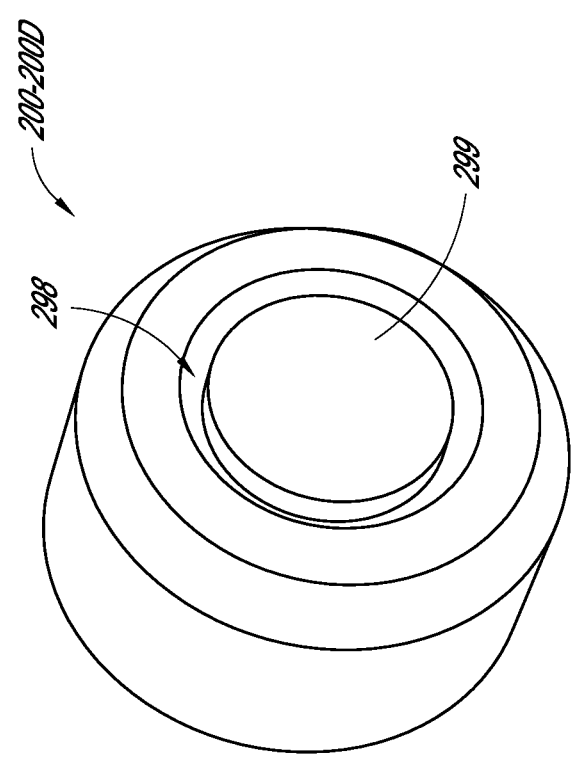
FIG. 9 shows an embodiment of a bottom of an active temperature control module.

FIG. 8 shows a charging assembly 400 can be provided for charging the module 200. The charging assembly 400 can have a charging plate 410 with one or more portions (e.g., recesses) 420 on which (e.g., into which) a bottom portion of the module 200-200D can be placed so that a corresponding electrical contact on a charging base 396 of the module 200 contacts an electrical contact 430 of the charging plate 410. In one embodiment, the electrical contact 430 can be circular, though other shapes are possible. In one embodiment, the electrical contact 430 is gold plated. The illustrated embodiment shows the charging plate 410 with two portions (e.g., recesses) 420 and two electrical contacts 430 to charge two separate modules 200-200D at the same time. However, in other embodiments, the charging plate 410 can have a single portion or recess 420 and single electrical contact 430. The charging plate 410 can connect via an electrical cord 440 to an electrical connector 450. In the illustrated embodiment, the electrical connector 450 is a wall connector for connecting to AC power. In other embodiments, the electrical connector 450 can be a connector for connecting to DC power, such as to a car charger. In still another embodiment, the electrical connector 450 can be a USB connector that allows the electrical cord to be connected to a computer, portable battery, or to a separate wall connector for connecting to a wall outlet (e.g., similar to charger for iPhone). With reference to FIG. 9, the module 200-200D can have an electrical contact 298 that is annular or donut shaped and surrounds a base surface 299.

Figure 10A:
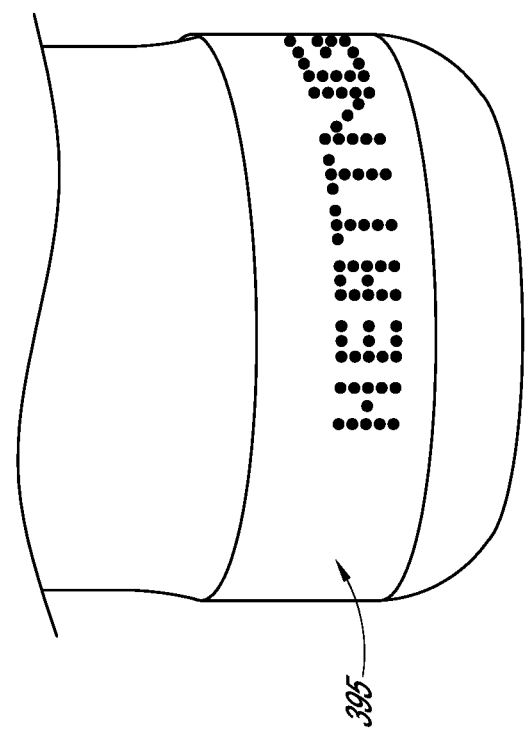
FIGS. 10A-10B show an embodiment of an active temperature control module with a visual indicator screen.
Figure 10B:
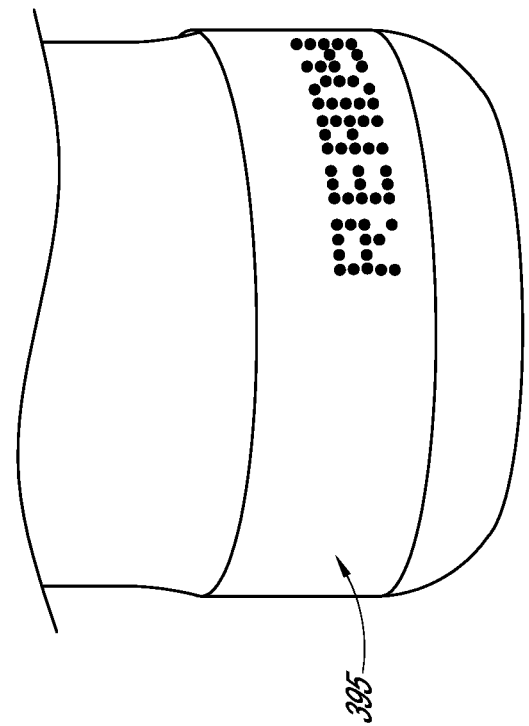

With reference to FIGS. 10A-10B, the module 200-200D can have a visual indicator screen 395 that can illustrate one or more logos or messages (e.g., regarding the operation of the module 200-200D).

Figure 11:
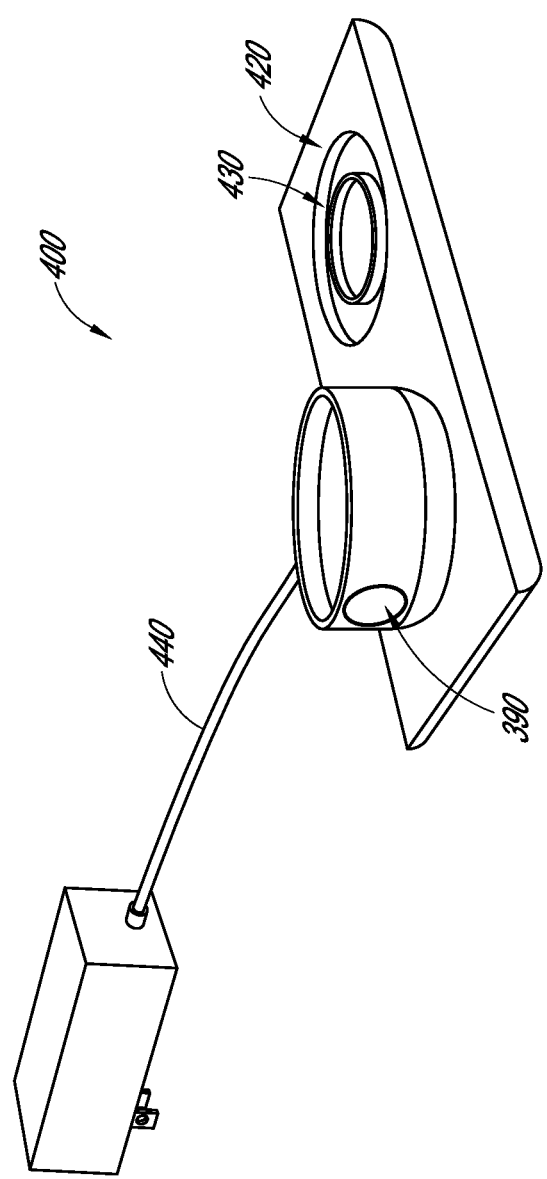
FIG. 11 shows an embodiment of a temperature control module on the charging assembly.

With reference to FIG. 11, the module 200-200D can optionally include one or more buttons 390 that a user can press to release the coupling between the module 200-200D and the container 100. For example, pressing the buttons 390 can optionally actuate the control circuitry 80 in the module 200-200D to change the polarity of the one or more magnets so that they provide a repelling force, instead or an attracting force, relative to the container 100. In another embodiment, pushing the buttons 390 mechanically decouples the magnets on the module 200-200D from the bottom wall of the container 100.

Figure 12B:
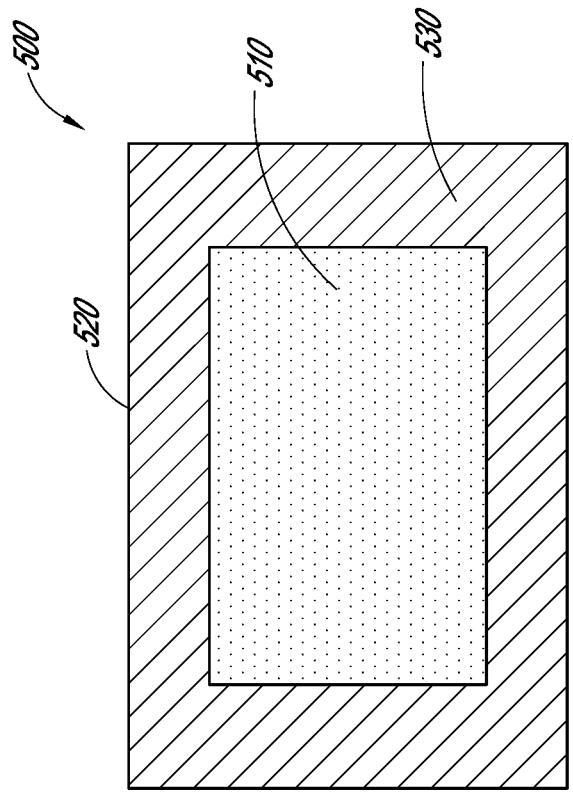
FIG. 12B shows a schematic cross-sectional view of the power storage unit of FIG. 12A.
Figure 12A:
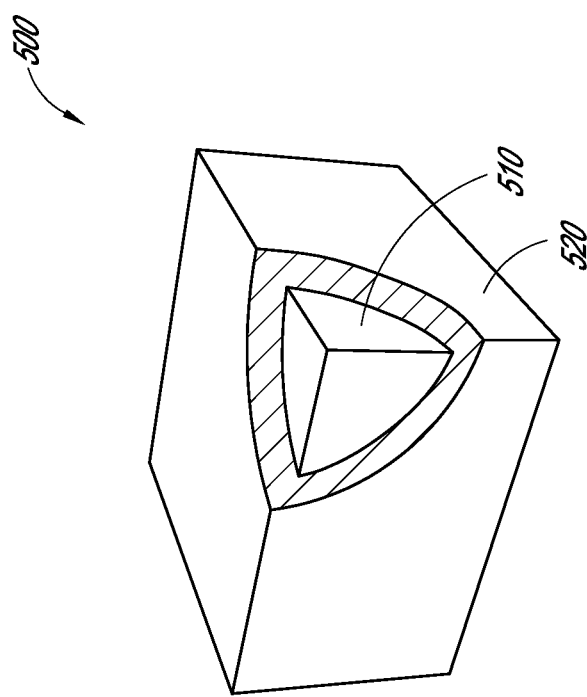
FIG. 12A shows a schematic view of an embodiment of a power storage unit for use in the temperature control module, with an outer portion of the unit partially removed.

FIGS. 12A-12B show one embodiment of a power storage unit 500 for use with the module 200-200D. The power storage unit 500 can include a power storage element 510 surrounded by a chamber 520 filled with a phase change material (PCM) 530. The phase change material 530 preferably has a transition temperature of between about 50 degrees F. to about 100 degrees F., in some embodiments about 70 degrees F. The phase change material 530 can advantageously have a transition temperature that can allow the phase change material 530 to protect the power storage element 510 from high temperature swings. For example, if the module 200-200D is accidentally placed in the dishwasher (with the container 100) to wash the container 100, the phase change material 530 can advantageously absorb heat resulting from the temperature swings during operation of the dishwasher, to avoid damage to the power storage element 510. Though FIGS. 12A-12B show one power storage element 510 enclosed by the phase change material 530, one of skill in the art will understand that a plurality of power storage elements 510 can be enclosed by the phase change material 530. In one embodiment, the PCM can enclose all the electronics in the module 200-200D, not just the power storage element(s) 510.

FIG. 13 shows a schematic view of an arrangement of one or more heat transfer elements 210-210D and one or more sensors 550 arranged on a surface 202 of the module 200-200D that is placed in thermal communication with the bottom end 20 (e.g., bottom surface 22) of the container 100. In one embodiment, the one or more sensors 550 includes a temperature sensor 550 that can sense a temperature of the liquid in the chamber 30 via the base 22 of the container 100. In one embodiment, the one or more sensors 550 communicates the sensed information (e.g., sensed temperature of the bottom surface 22 of the container 20) to the control circuitry 80, which determines a sensed liquid temperature in the container 10 (e.g., using an algorithm that correlates the sensed temperature of the bottom surface 22 with the temperature of the liquid in the container 10, such as taking into account the thermal conductivity of the bottom end 20 of the container 10). The one or more sensors 550 can be spaced apart from the one or more heat transfer elements 210-210D by a distance of at least about 10 mm, to inhibit the information sensed by the one or more sensors 550 being influenced by the proximity of the one or more heat transfer elements 210-210D; however other suitable distances are possible (e.g., at least about 5 mm). In one embodiment, the distance between the one or more sensors 550 and the one or more heat transfer elements 210-210D is substantially uniform in all directions. For example, where the one or more sensors 550 includes a temperature sensor 550, the temperature sensor 550 is disposed at least about 10 mm away from the one or more heat transfer elements 210-210D to inhibit the sensed temperature by the temperature sensor 550 being influenced by the energy output of the one or more heat transfer elements 210-210D.

Figure 14:
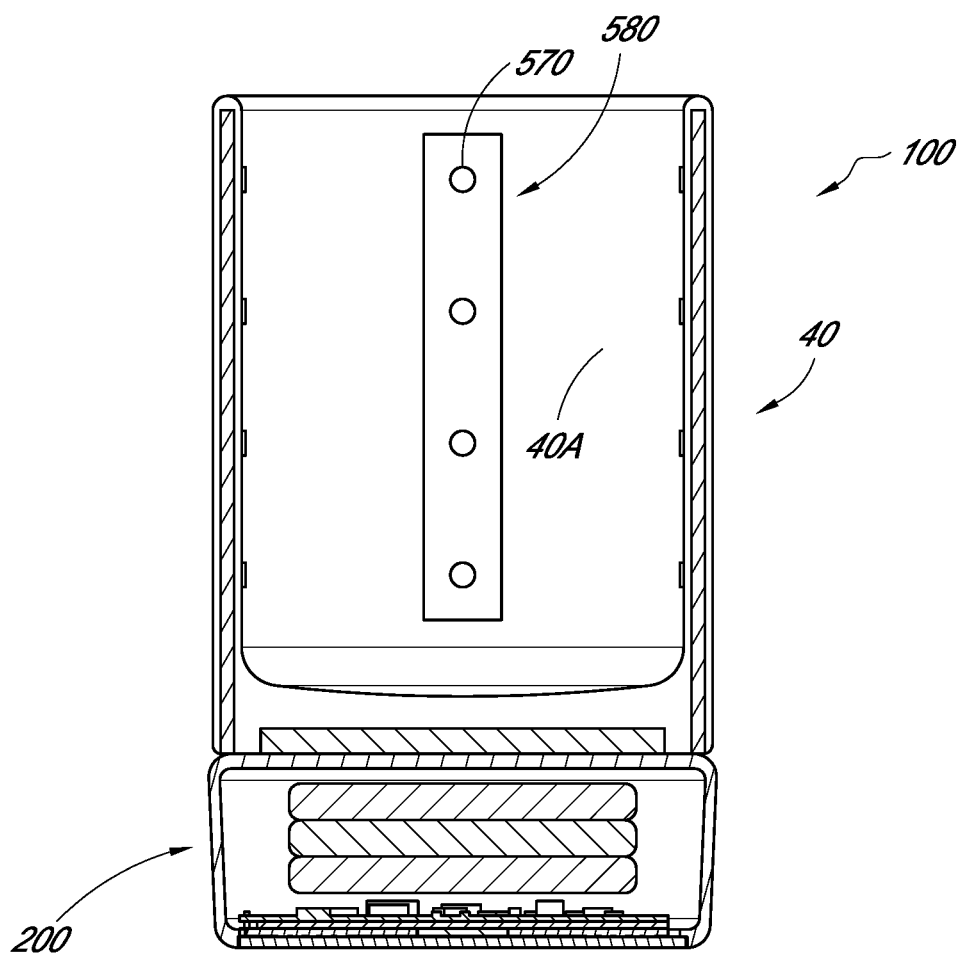
FIG. 14 shows a schematic view of a mug with one or more temperature sensors.

FIG. 14 shows a schematic view of a container 100 with one or more sensors 570 disposed along the height of the circumferential wall 40 of the container 100 to sense or measure a parameter of liquid in the chamber 30 of the container. In one embodiment, the one or more sensors 570 can be a plurality of sensors 570 arranged as a strip 580 along at least a part of the height of the circumferential wall 40 of the container 100. In the illustrated embodiment, the container 100 can be removably coupled to the module 200-200D, where the module 200-200D can have an electric contact (such as 7192 in FIG. 6A) that interfaces with the one or more sensors 570 when the module 200-200D is coupled to the container 100 in order to electrically connect the one or more sensors 570 with the control circuitry 80 in the module 200-200D. In one embodiment, the one or more sensors 570 can be capacitance sensors, or temperature sensors. Where temperature or capacitance sensors, the information sensed by the one or more sensors 570 can be used to estimate a liquid level in the container 100. For example, the liquid level in the container 100 can be estimated (e.g., by the control circuitry 80) by comparing a sensed reading (e.g., of temperature, capacitance) from one sensor relative to an adjacent sensor (e.g., estimating that the liquid level is at a location between two adjacent temperature sensors where the temperature readings from said adjacent temperature sensors vary by more than a certain amount). In other embodiments, the one or more sensors 570 can be other suitable types of sensors disclosed herein.

Figure 15:
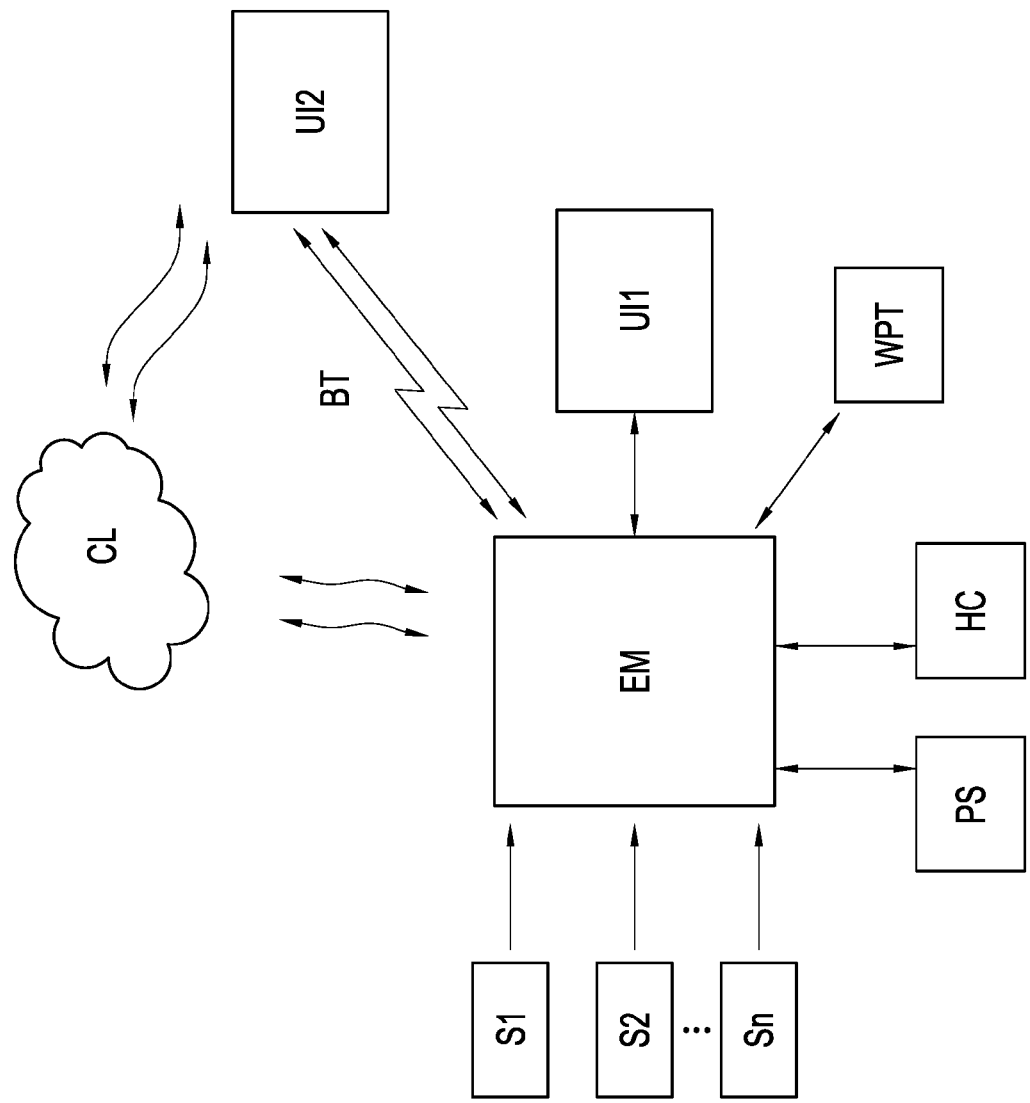
FIG. 15 is a schematic block diagram showing communication between the active temperature control module and a remote electronic device.

FIG. 15 above shows a block diagram of a communication system for any of the modules 200-200D of the containers described herein. In the illustrated embodiment, the electronic module EM (such as the electronic module disclosed herein for the module 200-200D), which can include the control circuitry 80, can receive sensed information from one or more sensors S1-Sn (e.g., liquid level sensors, liquid volume sensors, temperature sensors, battery charge sensors, capacitance sensors, tilt sensors or gyroscopes), which can include the one or more sensor 550, 570. The electronic module EM can also receive information from and transmit information (e.g., instructions) to one or more heating elements (or cooling elements or heating/cooling elements) HC, such as the elements 210-210D (e.g., to operate each of the heating elements in a heating mode, turn off, turn on, vary power output of, etc.) and optionally to one or more power storage devices PS, such as the power storage elements 60 (e.g., batteries, such as to charge the batteries or manage the power provided by the batteries to the one or more heating or cooling elements). The electronic module EM can also communicate with a wireless power transmitter WPT (e.g., an inductive power transmitter) optionally on the module 200-200D. The electronic module EM can also communicate with (e.g., transmit information to and receive information, such as user instructions like temperature setpoints from) a user interface UI1 on the module 200-200D (e.g., on the body of the module 200-200D). The electronic module EM can also communicate with an electronic device ED (e.g., a mobile electronic device such as a mobile phone, PDA, tablet computer, laptop computer, electronic watch; or a desktop computer) via the cloud CL or via a wireless communication system such as Bluetooth BT. The electronic device ED can have a user interface UI2, that can display information associated with the operation of the module 200-200D (as disclosed herein), and that can receive information (e.g., instructions, such as user selected temperature for the liquid in the container) from a user and communicate said information to the module 200-200D (as disclosed herein).

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the module 200-200D, as disclosed herein. That is, the electronic module or electronics can have different form factors.

Sensors

With respect to any of the containers disclosed above, one or more sensors S1-Sn can be provided. In some embodiments, at least one sensor S2 of the one or more sensors S1-Sn can sense a liquid level (or information indicative of a liquid level) in a chamber 30 of the container 100.

In one embodiment, the sensor S2 can be a load cell (in the module 200-200D) that can sense a weight of the container 100. The electronic module EM of the container 100 can receive the sensed weight information and compare it against a reference weight data (e.g., previously sensed when the container was empty and/or that is stored in a memory of the electronic module EM), and calculate a volume or level of the liquid in the container 100 (e.g., using an algorithm to convert the sensed weight information to liquid volume or level measurement).

In another embodiment, the sensor S2 can be a pressure sensor on a portion of the chamber 30 of the container 100 and can sense a hydrostatic pressure of the liquid in the chamber 30. The electronic module EM can calculate a liquid volume or level based at least in part on the sensed pressure information from the sensor S2.

In another embodiment, the sensor S2 can be a capacitance sensor (e.g., capacitance sensing strip) that extends along at least a portion of the length of a sidewall of the container 100. The sensor S2 can sense a capacitance of a liquid in the container 100 relative to a capacitance of air above the liquid level and communicate the sensed information to the electronic module EM, which can provide a measurement of liquid volume or liquid level in the container 100 based on the sensed information. In another embodiment, the sensor S2 can sense a conductivity of the liquid or air proximate the sensor and the electronic module EM can provide a measurement of liquid level or volume based at least in part on the sensed information.

In another embodiment, the sensor S2 can be an ultrasonic sensor on a sidewall of the container 100. The sensor S2 can use a pulse-echo or wall resonance (e.g. resonance of the sidewall of the container 100) to sense information indicative of a liquid level in the container. For example, the sensor S2 can sense a time it takes for pulse emitted by the sensor S2 into the chamber 30 of the container 100 to return to the sensor (e.g., once it bounces from the liquid level location). The sensor S2 can transmit the sensed information to the electronic module EM, which can provide a measurement of liquid volume or liquid level in the container based on the sensed information.

In another embodiment, the sensor S2 can be an accelerometer or tilt sensor (e.g., gyroscope). The sensor S2 can sense an orientation (or change in orientation) of the container 100 and communicate the sensed orientation information to the electronic module EM. The electronic module EM can estimate a liquid level in the container 100 based on the sensed orientation information (e.g., using an algorithm that correlates a tilt angle to a liquid level). For example, if the sensor S2 senses an orientation of less than a first threshold (e.g., less than 30 degrees from an upright position) when a user has the container 100 against their lips (e.g., sensed via a sensor on the container lip or lid, such as a contact sensor, temperature sensor, etc.) then the electronic module estimates the liquid level to be about full, and if the sensor S2 senses an orientation greater than a second threshold (e.g., greater than 90 degrees from an upright position) when a user has the container against their lips (e.g., sensed via a sensor on the container lip or lid, such as a contact sensor, temperature sensor, etc.) then the electronic module estimates the liquid level to be about empty, and the electronic module EM can use an algorithm to interpolate between the two thresholds to infer intermediate liquid levels of the container (e.g., half full, quarter full, etc.).

In another embodiment, the sensor S2 can be a light sensor that measures light attenuation through the liquid and provides the sensed information to the electronic module EM, which can provide a measurement of liquid volume or liquid level in the container based on the sensed information (e.g., using an algorithm to correlate light attenuation with liquid volume or level).

In another embodiment, liquid level in the container 100 is measured based on sensed temperature (or information indicative of temperature) from one or more (e.g., a plurality of) temperature sensors S3. In one embodiment, the one or more sensors S3 can sense how long it takes the temperature to increase a reference number of degrees (e.g., 1 degree F. or 1 degree C.) when the chamber 30 of the container 100 is full of liquid to provide a first reference time, and the first reference time can be stored in a memory (e.g., a memory of the electronic module EM). Optionally, additional reference times can be provided by the one or more sensors S3 when the chamber 115 of the container 100 has other volumes of liquid therein (e.g., half full, ¾ full) and the reference times stored in said memory. During operation of the container, the one or more temperature sensors S3 can measure how long it takes for the temperature in the chamber to change by said reference number of degrees and communicate the sensed time information to the electronic module EM, which can provide a measurement of liquid volume or liquid level in the container based on the sensed time information, for example, based on an algorithm correlating time versus liquid volume or level. In one embodiment, the sensed time information is compared against one or more of the reference times and the liquid level or volume interpolated between the level or volume values corresponding to the reference times. Optionally, the algorithm can calculate the liquid volume or level based at least in part on sensed ambient temperature (e.g., from a sensor S4), to account for variations in how long it takes the temperature to increases by the reference number of degrees depending on ambient temperature (e.g., at high altitude, low altitude, in winter, in summer, etc.). Use of the one or more temperature sensor S3 therefore advantageously allows measurement of temperature and liquid level in the container with one sensor instead of requiring a separate sensor to measure liquid level, which provides for a simpler and less costly system. In another embodiment, the module 200-200D can have a plurality of temperature sensors S3 along the length of the container 100 and the liquid level in the chamber 30 of the container 100 can be determined by the electronic module EM by comparing the sensed temperature readings from the plurality of temperature sensors S3 (e.g., estimating that the liquid level is at a location between two adjacent temperature sensors where the temperature readings from said adjacent temperature sensors vary by more than a certain amount).

Figure 16:
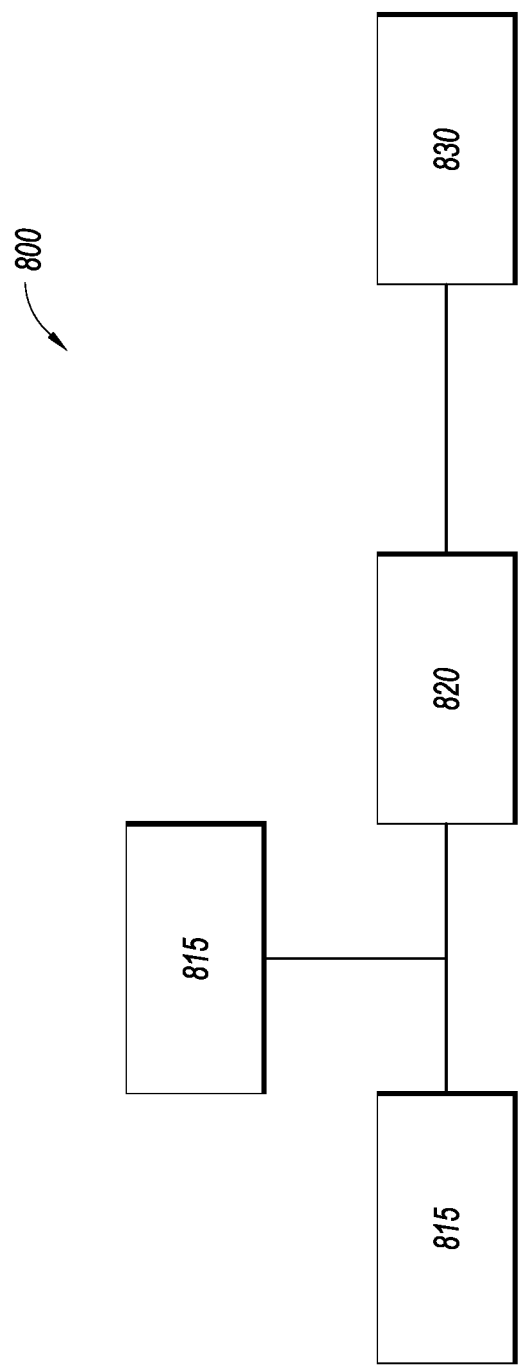
FIG. 16 shows a schematic view of a system for using a plurality of active temperature control modules.

FIG. 16 shows a schematic view of a method 800 for using a plurality of temperature control modules 200-200D in a commercial setting, such as a café or restaurant. The method 800 can include first identifying 810 the temperature the customer would like the liquid served at. For example, the café attendant or cashier or waiter can as the customer what temperature they would like their coffee or tea served at, after which the beverage could be poured into a container (e.g., mug), like the container 100 described herein, and a module 200-200D attached to the container 100 and turned on to maintain the beverage at the requested temperature. In one embodiment, the café attendant or cashier or waiter can pull 815 the module 200-200D from a set of modules 200-200D disposed on charging bases (e.g., like off a conveyor belt). The attendant, cashier or waiter could then tag 820 the customer to the container 100, for example using near field communication, to allow tracking of the module 200-200D. In one embodiment, the module 200-200D could have an alarm installed 830 that is activated when the module 200-200D is decoupled from the container 100, inhibiting users from decoupling the module 200-200D without detection. In another embodiment, the near field connection (e.g., Bluetooth connection) between the module 200-200D and the container 100 can be broken if the container 100 is more than a predetermined distance from a reference location (e.g., from the counter), and an alert (visual, audio) can be sent to an operator (e.g., attendant). In still another embodiment, the control circuitry 80 can receive a notification when the near field connection has been broken and cease operation of the module 200-200D. In one embodiment, the café, restaurant or establishment could have sensors near the exits to sense if a module 200-200D is passing through the exit, to inhibit theft of the modules 200-200D.

Figure 17:
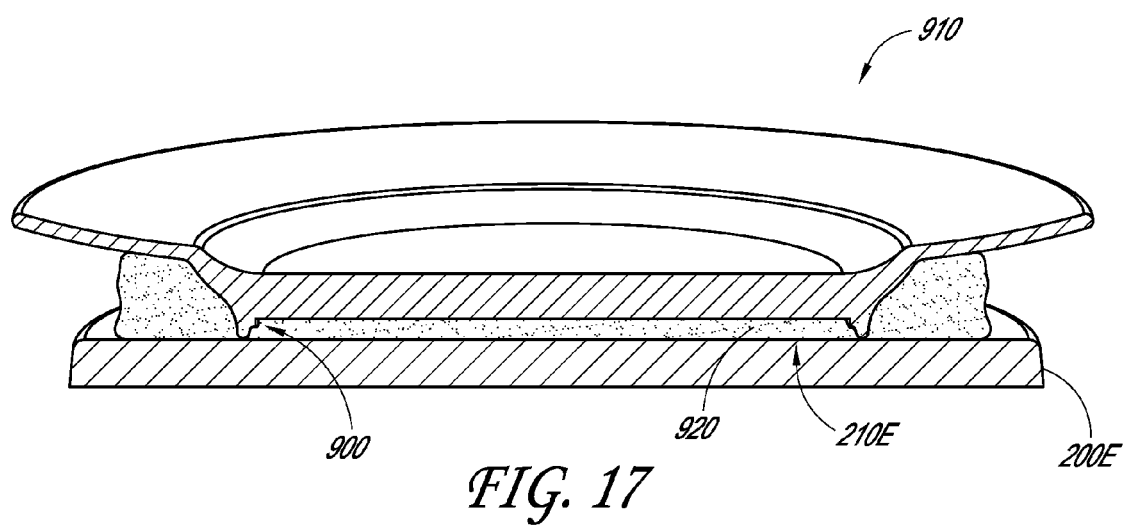
FIG. 17 is a schematic cross-sectional view of an embodiment of an active temperature control module for use with existing plateware.

FIG. 17 shows a schematic cross-sectional view of another embodiment of a temperature control module 200E, which is similar to the temperature control module 200-200D described above, except as noted below. The module 200E can be used with existing plateware or serverware that users may have (e.g., existing plates, bowls, platters, soup tureens, etc.). In the illustrated embodiment, the plateware is a plate 910 with a rim underneath its bottom surface that allows the bottom surface of the plate 910 to sit away from a supporting surface (e.g., table, counter). However, persons of skill in the art will recognize that the temperature control module 200E can be used with any type of plate, such as plates that do not have a rim or ridge on its bottom surface. For example, the module 200E can be used with plates with a bottom surface that sits flat and contacts the surface of the table, counter, etc. That is, the module 200E can be used with existing plateware and serverware, irrespective of the shape of the plateware or serverware.

The module 200E can have some of the same components as described above for the modules 200-200D, including control circuitry 80, one or more power storage elements 60, and one or more heat transfer elements 210E. Additionally, the module 200E has a heat transfer pack 900 that protrudes from a top surface of the module 200E and is in thermal communication with the one or more heat transfer elements 210E. In one embodiment, the heat transfer pack 900 includes a thermally conductive material 920, such as a thermally conductive gel or thermal gap pad material, which contacts a bottom surface of the plateware when it is placed on the module 200E. In one embodiment, the heat transfer pack 900 is flexible. For example, when used with a plate 910 that has a rim or ridge on its bottom surface, the heat transfer pack 900 can fill the space between the rim of the plateware 910 and the bottom surface of the plateware 910 and optionally also contact a bottom surface of the plate 910 that is outward from the rim or ridge of the bottom of the plate, allowing heat transfer between the one or more heat transfer elements 210E and a bottom surface of the plateware 910. As discussed above, the module 200E can be used with existing plateware and serverware irrespective of the shape of the plateware or serverware. Accordingly, when used with plates that have a flat bottom surface (i.e., no ridge or rim on the bottom surface), the heat transfer pack 900 contacts at least the flat bottom surface of the plate.

Advantageously, because the module 200-200D is removable, it can be used with a plurality of separate containers 100. Thus, a user can use one module 200-200D to heat a plurality of separate containers 100 and need not purchase a plurality of containers that each includes its separate electronics and active temperature control module 200-200D.

Figure 18:
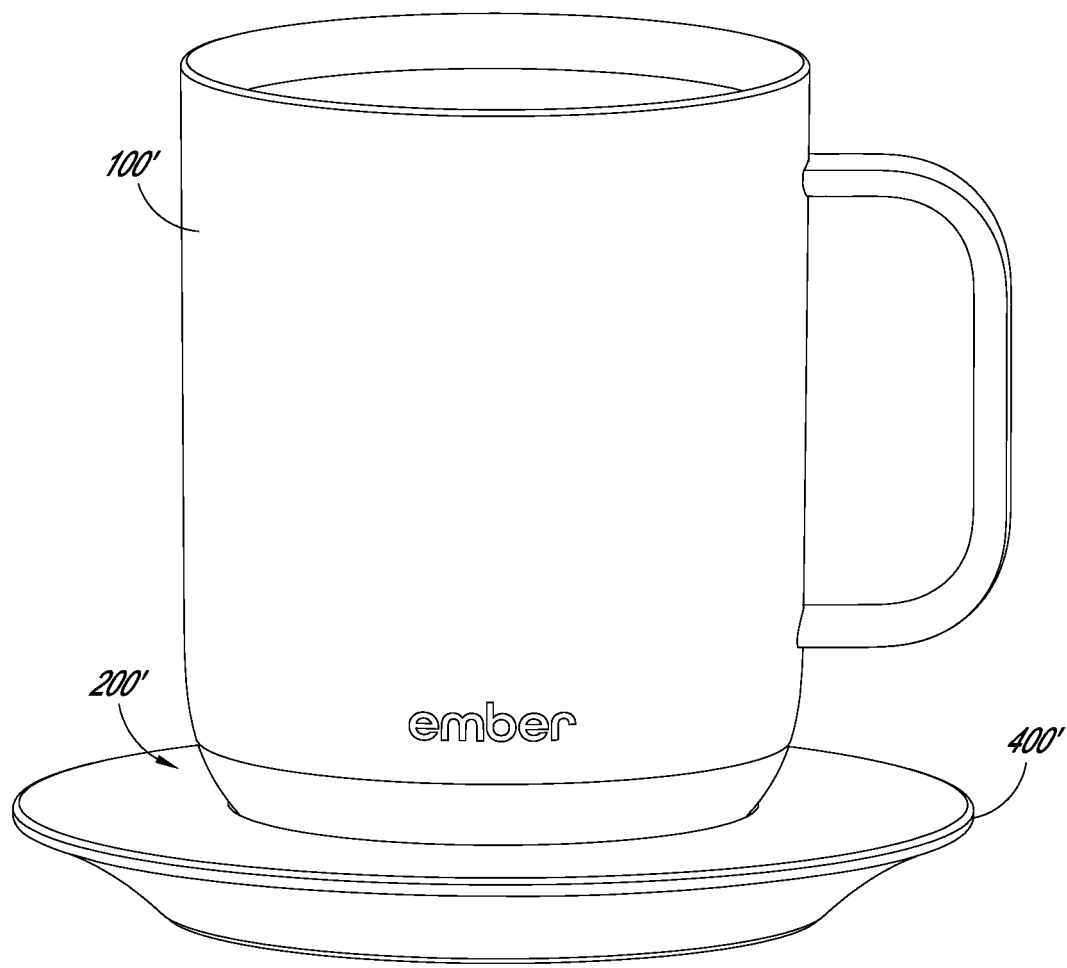
FIG. 18 shows a perspective view of another embodiment of a mug with a charging coaster.
Figure 19:
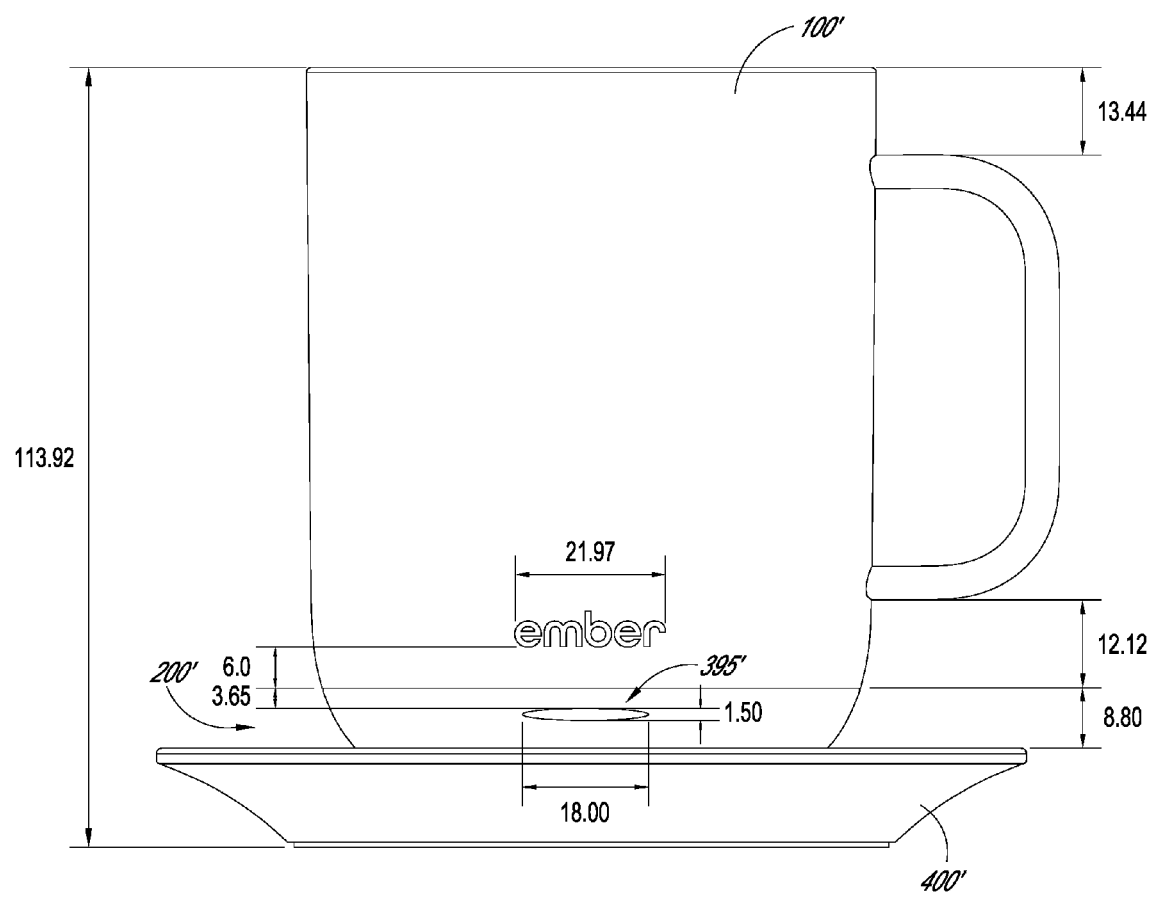
FIG. 19 shows a schematic front view of the mug and charging coaster of FIG. 18.

FIGS. 18-19 shows another embodiment of a drinkware container (e.g., mug) 100' that includes an active temperature control module 200'. A charging assembly 400' in the shape of a coaster can receive the drinkware container 100' thereon. Advantageously, the drinkware container 100' and charging assembly (charging coaster) 400' look like conventional/typical mugs and coasters. The drinkware container 100' has a visual indicator 395' in a bottom portion of the mug 100'. As shown in FIGS. 18-19, when the drinkware container 100' sits on the charging assembly (charging coaster) 400', the visual indicator is located vertically above the charging coaster 400' so that it is visible. The visual indicator 395' can be an LED light that can illuminate in a variety of different colors, as further discussed below. In one embodiment, the visual indicator 395' can be a single LED light (e.g., a hidden till lit LED light).

Figure 20:
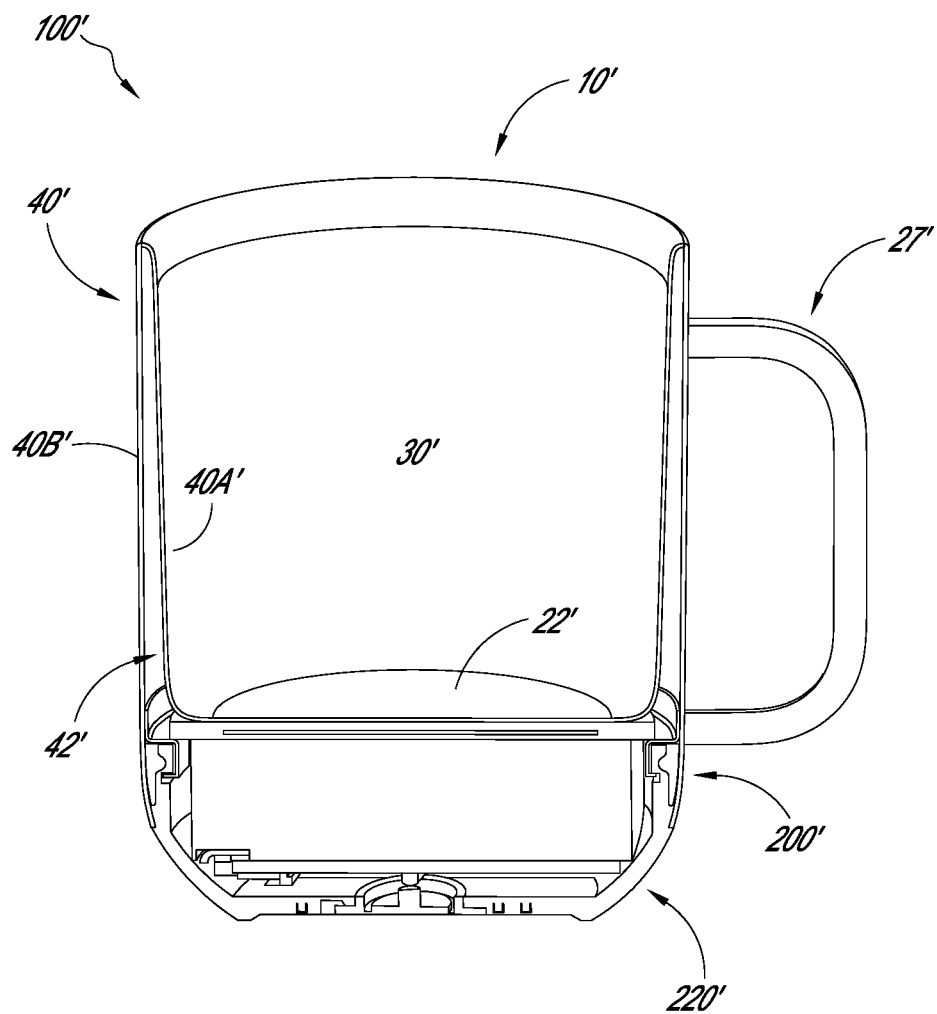
FIG. 20 shows a cross-sectional assembled view of the mug of FIG. 18.
Figure 21:
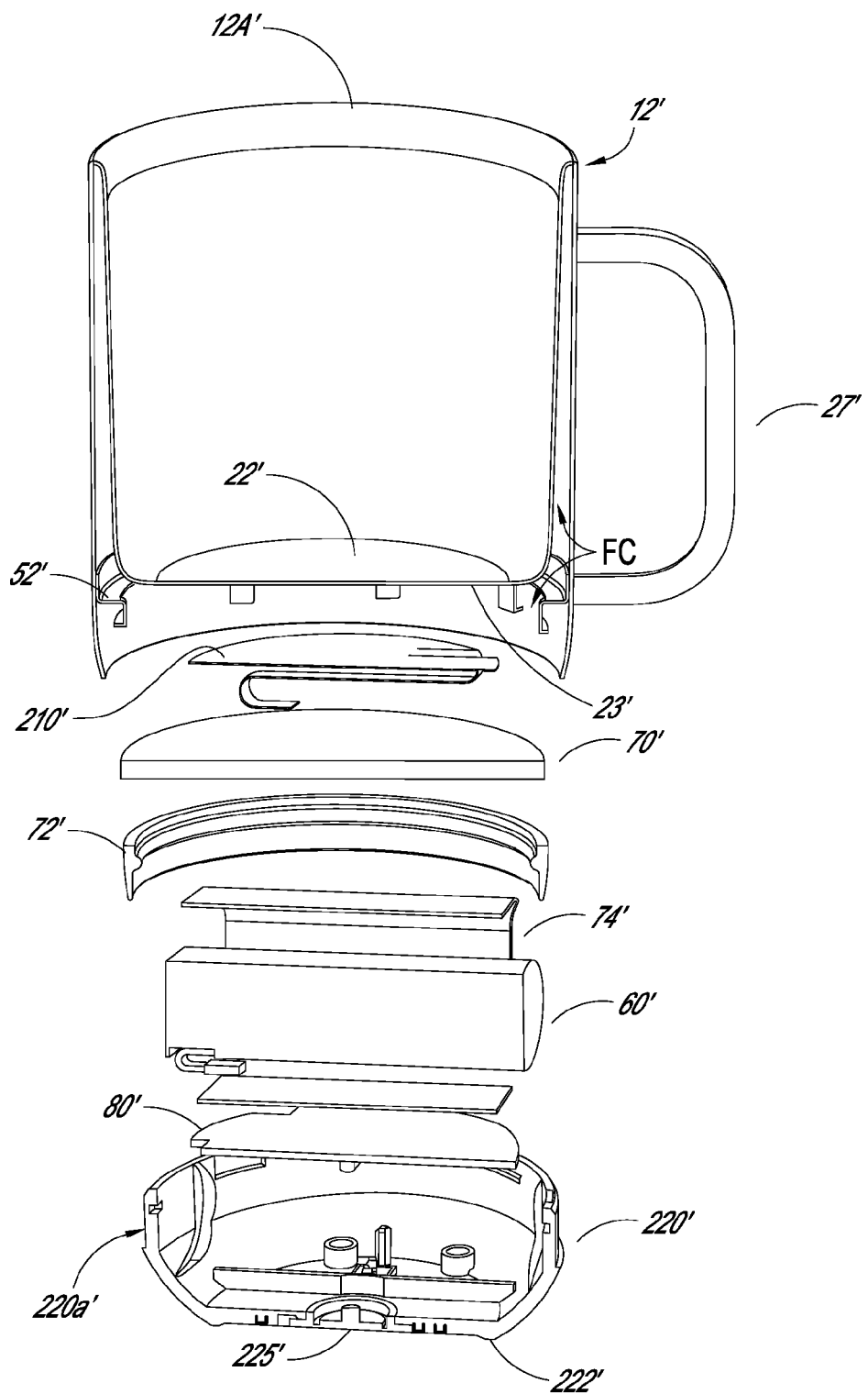
FIG. 21 shows a cross-sectional exploded view of the mug of FIG. 18.

FIGS. 20-21 shows a cross-sectional assembled and exploded side view, respectively, of the drinkware container (e.g., mug) 100', which has an open top end 10', a base or closed bottom end 20' having a bottom (e.g., base) surface 22', and a cavity or chamber 30' defined by a circumferential wall 40' and the base 20'. Optionally, the drinkware container (e.g., mug) 100' can have a handle 27'. In one embodiment, the handle 27' can be detachable (e.g., include a rare earth magnet that allows it to couple to the wall 40'. The handle 27' can include a customizable feature that allows the user to readily identify the drinkware container (e.g., mug) 100' as theirs and distinguish it from others. For example, different handle designs 27' can be attached to the wall 40' of the same drinkware container (e.g., mug) 100' to facilitate identification of the mug 100'. In another embodiment, a colored ring can be clipped to the handle 17' to facilitate identification. In one embodiment (not shown), a lid can be provided to cover the top end 10' to further aid in maintaining the temperature the liquid in the drinkware container (e.g., mug) 100', such as when the drinkware container (e.g., mug) 100' is not in use or is being moved around the office or home.

The base 20' and circumferential wall 40' of the drinkware container 100' are made of a thermally conductive material, such as a metal (e.g., stainless steel), which advantageously provides a durable drinkware material 100' that does not break easily. The drinkware container (e.g., mug) 100' is double walled, where the circumferential wall 40' has an inner wall 40A' and an outer wall 40B' that is spaced apart from the inner wall 40A' to define an annular channel or chamber 42' therebetween. The inner wall 40A' couples to the outer wall 40B' at a proximal end 12' of the drinkware container (e.g., mug) 100' that defines a rim 12A' (e.g., drinking rim), so that the annular channel 42' extends to about the proximal end 12' between the inner wall 40A' and outer wall 40B'. Accordingly the base 20' is suspended (e.g., not attached laterally) relative to the outer wall 40B'. In one embodiment, the base 20' is single walled with a thickness of between about 0.2 mm and about 13 mm, in some embodiments about 0.3 mm. The circumferential wall 40', including the inner wall 40A' and outer wall 40B' can be a deep drawn stainless steel structure, where the outer wall 40B' is coated with a ceramic material so the drinkware container (e.g. mug) 100' looks like a typical ceramic mug.

The outer wall 40B' of the drinkware container (e.g., mug) 100' is coated with a ceramic material so that the drinkware container (e.g., mug) 100' looks like a conventional ceramic mug. The ceramic material advantageously allows the drinkware container (e.g., mug) 100' to be coated with text and or logos, in the same manner conventional mugs are. In one embodiment, the outer wall 40B' of the drinkware container (e.g., mug) 100' can be laser etched with artwork.

In one embodiment, the chamber 42' is empty (e.g., filled with air). In another embodiment, the chamber 42' can optionally be filled with an insulative material (e.g., polyurethane foam). The insulative material can advantageously enhance the thermal properties of the drinkware container (e.g., mug) 100' by inhibiting heat loss through the circumferential wall 40'. Additionally, the insulative material can reduce or inhibit the metallic sound of the drinkware container (e.g., mug) 100' (e.g., ceramic coated mug), allowing the drinkware container (e.g., mug) 100' to sound similar to a conventional ceramic mug. In still another embodiment, the chamber 42' can be under vacuum. In still another embodiment, the annular channel or chamber 42' can be filled with a phase change material (PCM) that can reduce the temperature of a liquid poured into the chamber 30' that has a temperature above the transition temperature of the PCM.

With continued reference to FIGS. 20-21, the temperature control module 200' is housed in a cavity 50' defined below the base 20', and more particularly defined at least in part below the surface 22' and surrounded by the outer wall 40B'. As discussed above, the base 20' is suspended relative to the outer wall 40B'. Optionally, the cavity 50' is in communication with the annular channel 42', as shown by the arrow FC in FIG. 21.

With continued reference to FIGS. 20-21, the drinkware container 100' can have a locking ring 52' attached to the inner surface of the outer wall 40B' below the base 20'. The locking ring 52' can retain a thermal insulation member 70' against the base 20'. The locking ring 52' can be made of metal (e.g., stainless steel) and have a plurality of engaging members (e.g., hooks, teeth) 52a'. in one embodiment, the locking ring 52' is fixed (e.g., welded) to the inner surface of the outer wall 40B'. The thermal insulation member 70' can optionally extend across the inner width of the cavity 50' so as to define a barrier between the cavity 50' and the annular channel 42'.

A heating element 210' can be in thermal contact (e.g., in direct contact with, adjacent to) the base 20' so that the heating element 210' is between the base 20' and the thermal insulation member 70'. In one embodiment, the heating element 210' can be adhered to a surface 23' of the base 20' with an adhesive. In one embodiment, the heating element 210' can be a heater flex. The heating element 210' can connect with control circuitry 80' (e.g., a printed circuit board, PCB) as further discussed below.

Figure 24:
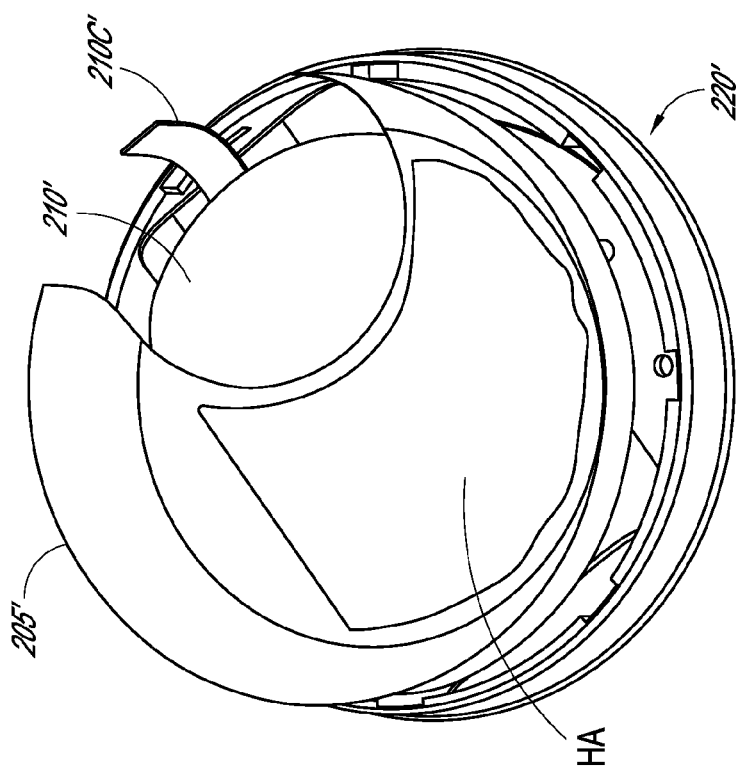
FIG. 24 shows a partial sectional view of internal components of the mug of FIG. 18.

Optionally, a heat conductive coating or tape 205', such as copper coating, can be disposed on the outer surface of the inner wall 40A' (e.g., adhered to at least a portion of the surface 23' and side surface 24') and disposed between the inner wall 40A' and the heating element 210'. The heat conductive coating or tape 205' can advantageously draw heat from the heating element 210' away from the insulation layer 70' and instead direct it to the side surface 24' of the inner wall 40A', thereby reducing the amount of heat directed to the insulation layer 70' and that would need to be directed by the heat spreader 74' away from the one or more power storage elements 60'. Advantageously, as shown in FIG. 24, the heat conductive coating or tape 205' does not cover the area of the heating element 210' that includes the extension 210C' with the sensors 216A', 216B' or that has the temperature sensor 216D' or sensor 216C', thereby drawing heat away from the extension 210C' and sensors 216D', 216C' and directing it to the side surface 24' of the inner wall 40A'. In one embodiment, the heat conductive coating o tape 205' is adhered to the inner wall 40A'. In another embodiment, the inner wall 40A' can be dipped into a heat conductive coating material (e.g., copper coating material), with a portion of the surface 23', 24' (e.g., corresponding to where the extension 210C' and sensors 216A', 216B' would be disposed) masked to prevent that section being coated with the heat conductive coating.

Figure 30A:
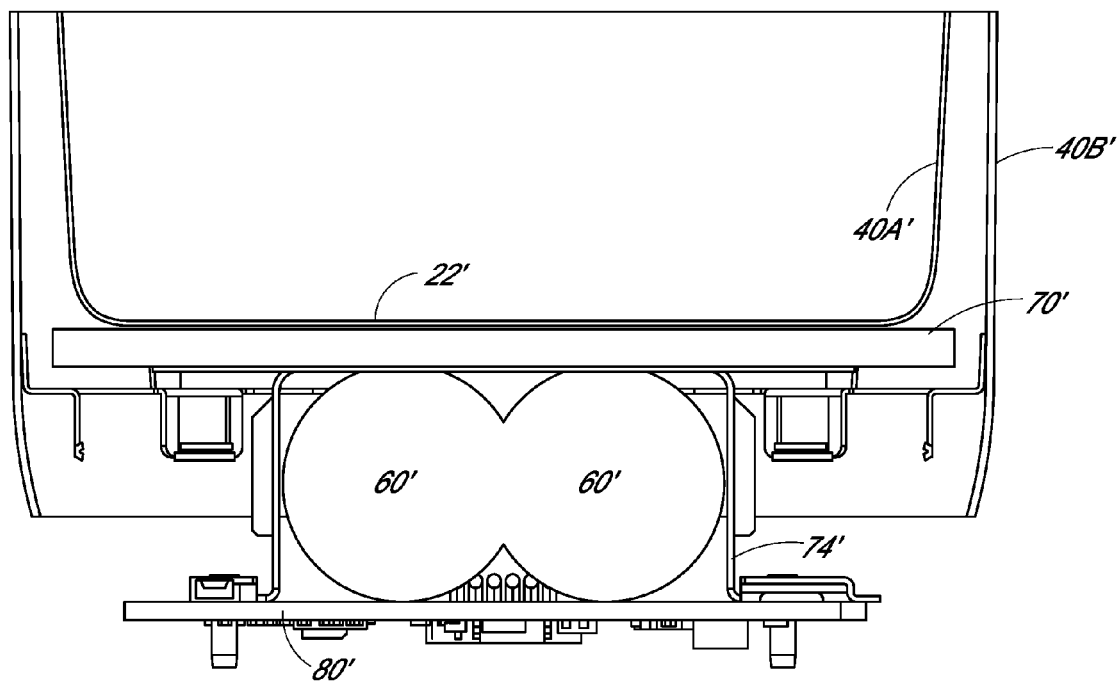
FIG. 30A-30B shows schematic cross-sectional views of heat spreader design.
Figure 30B:
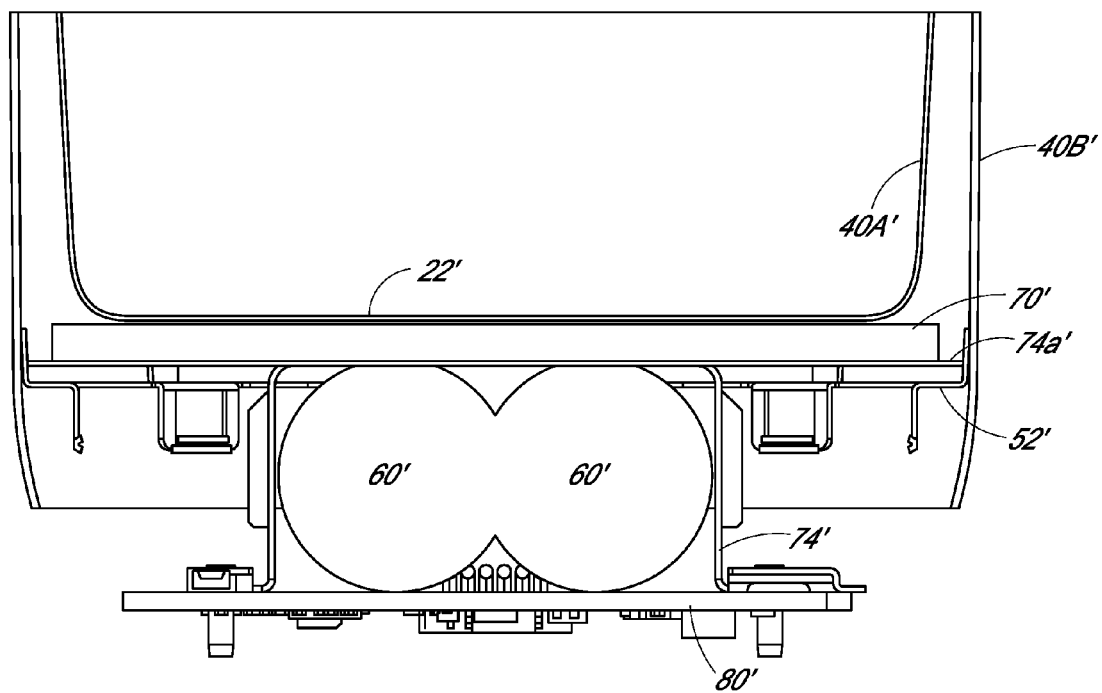

Also disposed in the cavity 50' can be one or more power storage elements (e.g., batteries) 60'. In one embodiment, the one or more power storage elements 60' can be two batteries (e.g., rechargeable batteries). As shown in FIG. 30A, a heat spreader 74' can be disposed about the one or more power storage elements (e.g., batteries) 60' can facilitate dissipation of heat from the cavity 50' (e.g., from the thermal insulation member 70'). In one embodiment, the heat spreader 74' can connect to an inner surface of the outer wall 40B to dissipate heat from the cavity 50' to the outer wall 40B, as further discussed below. For example, as shown in FIG. 30B, in one embodiment, the heat spreader 74' can include a foil wrap laminate layer 74a' (e.g., of aluminum, copper, graphite) that extends between and operatively contacts the outer wall 40B' and can drop the temperature by an additional 15-20 degrees (e.g., a drop of about 16 degrees Celsius, such as from 61 degrees C. to 45 degrees C.) by connecting with an inner surface of the outer wall 40B'. Without such a layer 74a' (e.g., with the structure shown in FIG. 30A) the heat spreader 74' can drop the temperature by about six degrees (e.g., from about 61 Celsius to about 56 Celsius).

With continued reference to FIGS. 20-21, an end cap 220' can couple to the locking ring 52'. For example, the end cap 220' can have a plurality of engaging elements (e.g., recesses or slots) 220a' that engage the engaging members (e.g., hooks or teeth) 52a' of the locking ring 52'. Advantageously, the end cap 220' can couple with the locking ring 52' so that the outer surface of the end cap 200' is flush with the outer wall 40B' to present a substantially seamless structure for the assembled drinkware container (e.g., mug) 100'.

A compression molded gasket 72' can optionally be annularly disposed between an outer surface of the end cap 220' and an inner surface of the outer wall 40B' that defines the cavity 50'. Advantageously, the compression molded gasket 72' can seal the end cap 220' against the outer wall 40B' and inhibit (e.g., prevent) entry of liquid into the cavity 50'. The end cap 220' can engage the locking ring 52' to couple the end cap 220' to the circumferential wall 40' of the drinkware container (e.g., mug) 100' to complete the assembly, with the electronics disposed between the base 20' and the end cap 220' in the cavity 50'. Therefore, the end cap 220' defines the bottom end of the drinkware container 100' once assembled to the outer wall 40B'. For example, the following components can be disposed in the following order between the base 20' and the end cap 220': heating element 210', insulation member 70', heat spreader 74', one or more power storage elements 60', and control circuitry (PCB) 80'. The end cap 220' can be made of plastic, which advantageously allows a transmitter, receiver and/or transceiver (e.g., Bluetooth transmitter) on the control circuitry 80' to transmit information to and/or receive information from outside the drinkware container (e.g., mug) 100'. In one embodiment, the transmitter, receiver and/or transceiver can be housed in the handle 27' and communicate with the control circuitry 80' via a conduit in the handle 27'.

The end cap 220' can have a button 225' movably mounted on a bottom surface 222' of the end cap 220' (e.g., substantially at the center of the bottom surface 222'). The button 225' can movably engage a switch on the control circuitry 80' to perform one or more functions. For example, pressing the button 225' can turn power on/off to the electronics of the drinkware container (e.g., mug) 100', such as tuning power on/off to the heating element 210'; can toggle through one or more temperature set points or temperature ranges stored in a memory of the control circuitry 80' and to which the heating element 210' can be operated; reset one or more operating parameters of the electronics in the drinkware container (e.g., mug) 100'; initiate one or more test or diagnostic functions of the drinkware container 100'; pair the drinkware container (e.g., mug) 100' with a remote control (e.g., a mobile electronic device; and/or toggle through one or more colors shown by the visual indicator

395'. For example, the user can turn on power to the drinkware container (e.g., mug) 100' by pushing the button 225' once, and turn off power to the drinkware container (e.g., mug) 100' by pressing on the button 225' for a predetermined period of time (e.g., 2 seconds, 3 seconds). The user can optionally push the button 225' for a predetermined period of time (e.g., 4 seconds, 5 seconds), such as if the drinkware container (e.g., mug) 100' has been off, to pair the drinkware container (e.g., mug) 100' with a mobile electronic device, after which the user can select the color for the visual indicator 395' via an app downloaded to their mobile electronic device. If the user never pairs the drinkware container (e.g., mug) 100' with a mobile electronic device, the visual indicator 395' will use a default color. The user can optionally reset the electronics in the drinkware container (e.g., mug) 100' by pressing on the button 225' for a predetermined period of time (e.g., 7 seconds, 8 seconds, etc.). The user can optionally reset the electronics in the drinkware container (e.g., mug) 100' to the factory settings by pressing on the button 225' for a predetermined period of time (e.g., 14 seconds, 15 seconds, etc.). In one embodiment, the drinkware container (e.g., mug) 100' can have a shipping mode (e.g., entered into at the factory prior to shipping to run tests on the mug 100') where motion of the drinkware container (e.g., mug) 100' does not turn on power to the mug 100'; however, once the button 225' is subsequently pressed and mug 100' moved, the shipping mode is disabled.

As discussed above, in one embodiment, the user can press the button 225' to toggle through different temperature set points for operation of the drinkware container (e.g., mug) 100'. In one embodiment, such different temperature set points can be illustrated by a color illuminated by the visual indicator 395' (e.g., red for relatively hotter, pink for less hot, blue for relatively cooler, etc.). For example, the user can optionally press and hold the button 225 for a predetermined period of time to activate the toggle function and once activated (e.g., indicated by flashing visual indicator 395') can press or tap button 395' to toggle between preselected temperatures or temperature ranges.

In another embodiment, the end cap 220' can include a capacitance touch sensor. In this embodiment, the user can slide their finger along a surface of the end cap 220' to select an operating temperature or temperature range for the drinkware container (e.g., mug) 100' as indicated by the visual indicator 395'.

In still another embodiment, the handle 27' can include temperature controls (e.g., capacitance touch sensors or slider, buttons, rotary ring) for the user to select the operating temperature or temperature range (e.g., hot, warm) for the drinkware container (e.g., mug) 100'.

In still another embodiment, the charging assembly (e.g., charging coaster) 400' can include temperature controls (e.g., touch sensors, buttons) on a rim thereof that a user can actuate while the drinkware container (e.g., mug) 100' is placed on the charging coaster 400' to select the operating temperature or temperature range for the drinkware container (e.g., mug) 100'. In one embodiment, the temperature control can be a touch sensitive LED color bar the user can slide their finger over to select the approximate desired temperature for the liquid in the chamber 30'. The LED color bar can allow the user to adjust the temperature set point for the liquid in the chamber 30' by sliding their finger along the bar (e.g., between a relatively less hot temperature and a relatively more hot temperature).

In still another embodiment, the charging assembly (e.g., charging coaster) 400' can include a hall effect sensor that can sense rotation of the drinkware container (e.g., mug) 100' while on the charging coaster 400'. The user can rotate the drinkware container (e.g., mug) 100' to adjust the temperature set point. The charger can sense the change in angular position of the mug 100' correlate said change with a change in temperature set point and identify said change for the user (e.g., via an LED color bar, via change in the color provided by the visual indicator 395', via one or more visual lights on the charging coaster 400' that change color with the angular orientation of the mug 100'), and communicate the change in temperature set point to the control circuitry 80', which can control the heating element 210' to effect the change.

Figure 23:
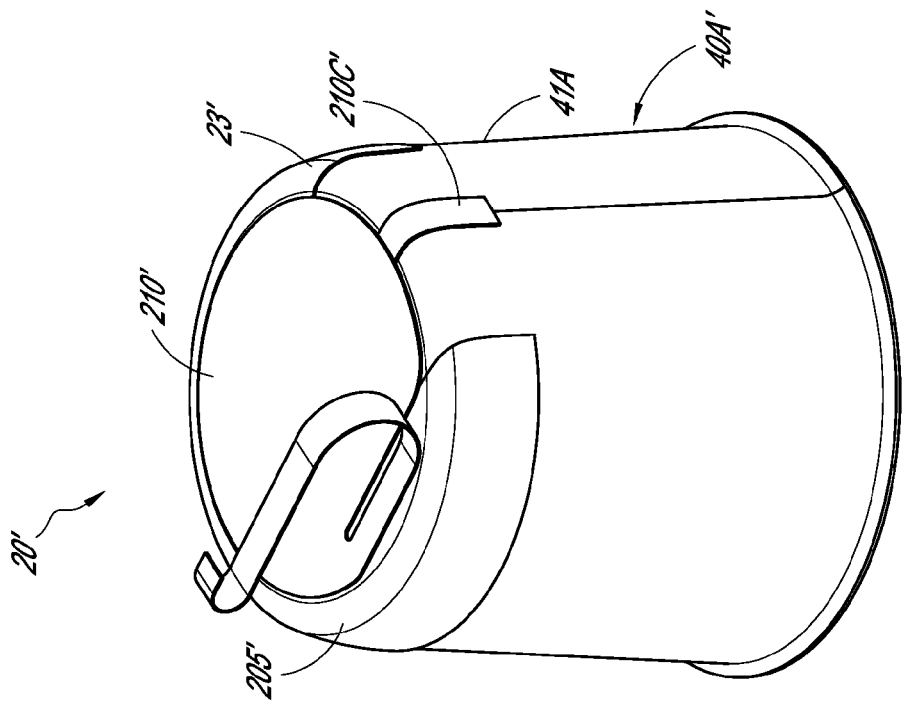
FIG. 23 shows a perspective bottom view of internal components of the mug of FIG. 18.
Figure 22:
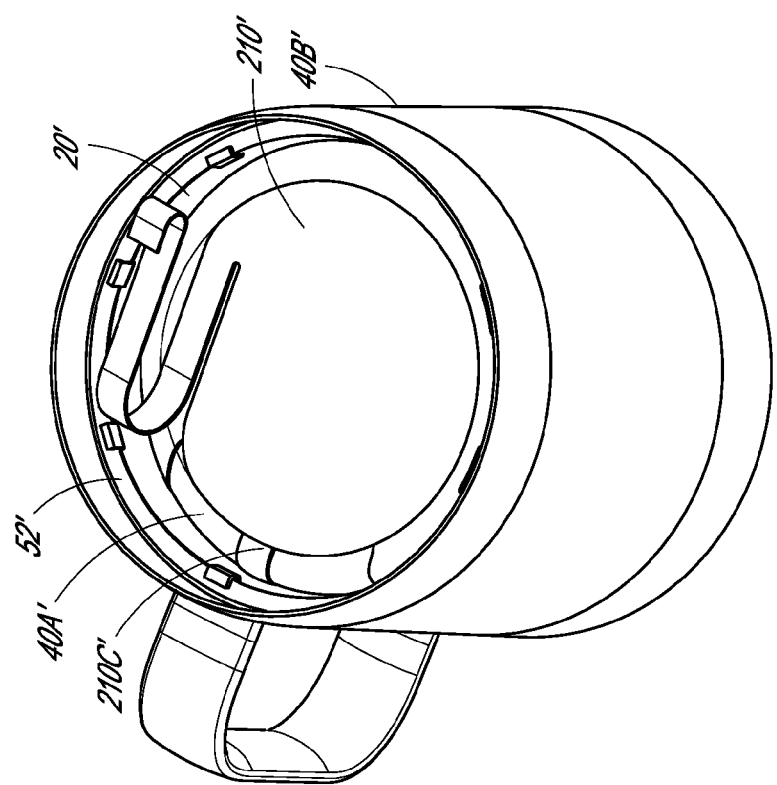
FIG. 22 shows a partially assembled bottom view of the mug of FIG. 18.
Figure 25:
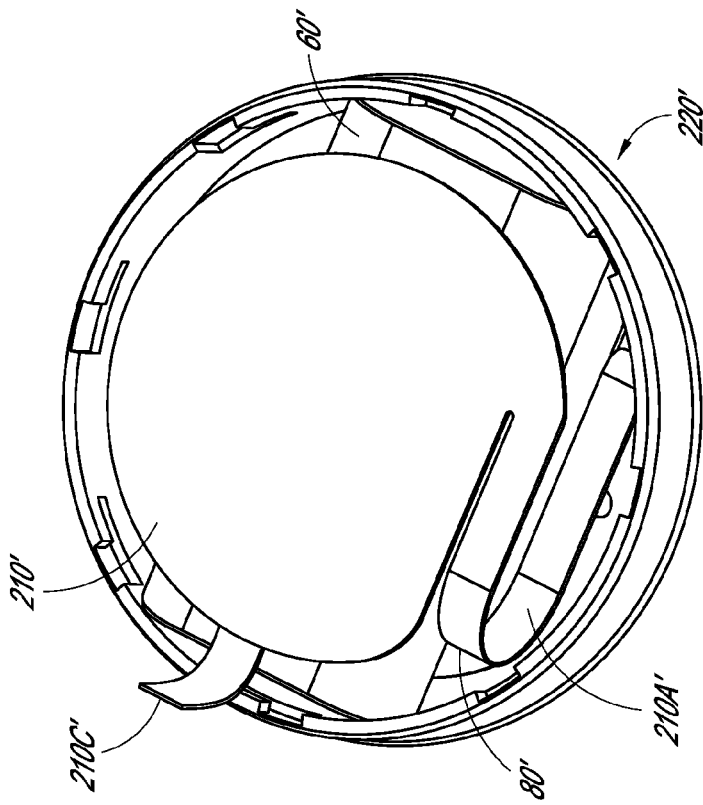
FIG. 25 shows a sectional view of internal components of the mug of FIG. 18.

FIGS. 22-26 show views of the heating element 210' attached to the base 20', such as to an outer surface 41A' of the inner wall 40A'. FIG. 22 shows the bottom view of the drinkware container (e.g., mug) 100' with the end cap 220' and electronics removed, and shows the heating element 210' attached to the base 20'. FIG. 23 excludes the outer wall 40B' for clarity and shows the heating element 210' attached to the base 20'. FIG. 24 shows the heat conductive coating or tape 205' that attaches to the surface 23' of the base 20' that is opposite the surface 22' and under which the heating element 210' is disposed. As described further below, the heating element 210' defines a crescent shaped heating area HA. That is, the heating element 210' does not heat the entire bottom surface 22' (i.e., the heating area is not circular). FIG. 25 excludes the inner wall 40A' for clarity and shows the heating element 210' arranged above the one or more power storage elements 60' and an extension 210A' of the heating element 210' connected to the control circuitry 80' arranged below the one or more power storage elements 60' within the end cap 220'.

Figure 26:
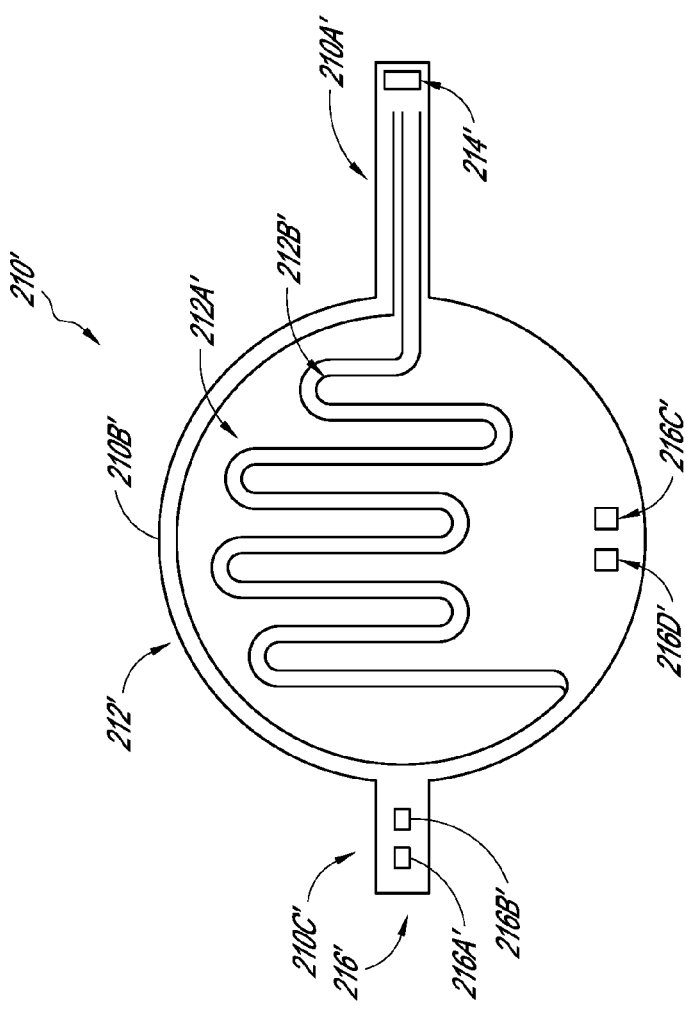
FIG. 26 shows a schematic view of a heater and sensor assembly of the mug of FIG. 18.
Figure 29:
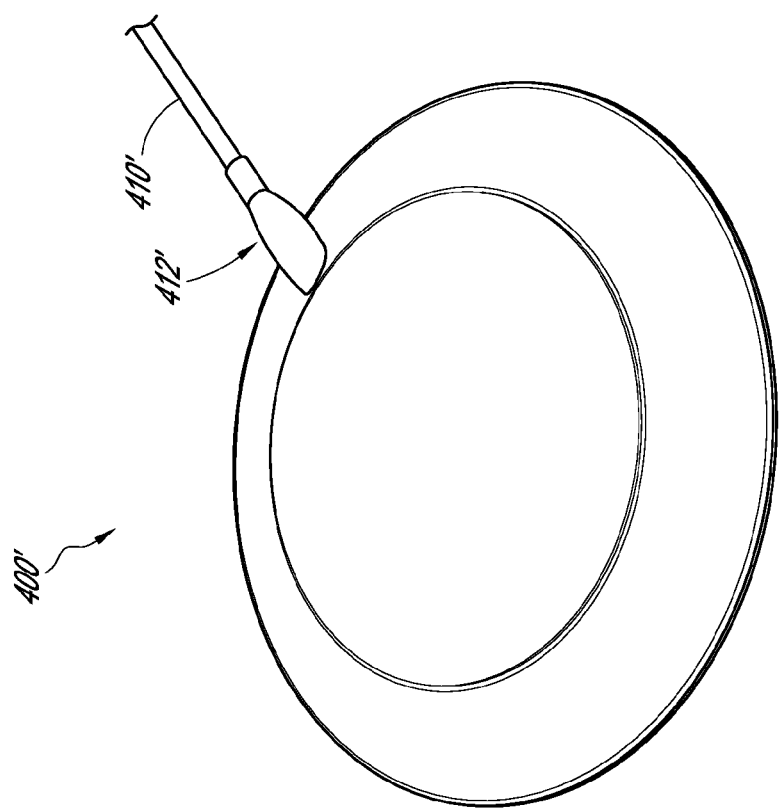
FIG. 29 shows a perspective bottom view of the charging coaster of FIG. 18.
Figure 31:
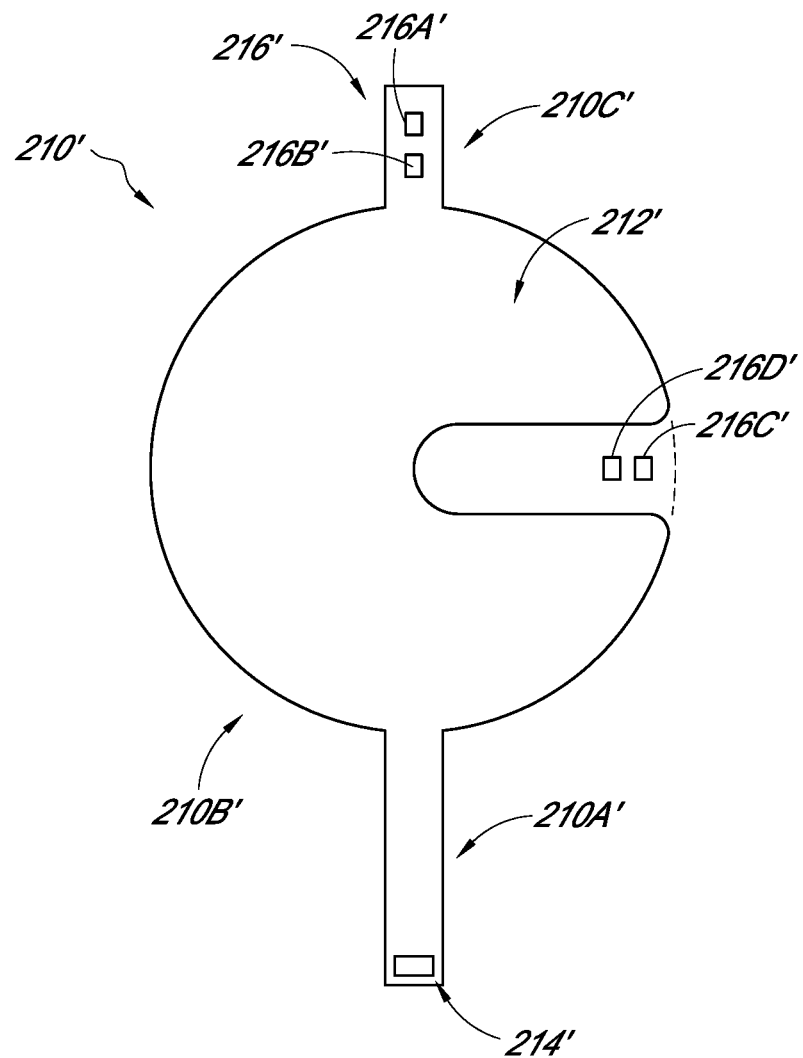
FIG. 31 shows a schematic view of a heating element.

FIG. 26 schematically shows the heating element 210'. The heating element 210' can have one or more heaters 212' (e.g., heater wires). In the illustrated embodiment, the heating element 210' has a first heater 212A' and a second heater 212B' that extend along a portion (but not all) of a generally planar area 210B' of the heating element 210'. The first and second heaters 212A', 212B' can extend in an undulating fashion over a portion of the heating element 210' generally resembling a crescent, "Pac-Man" or C-shape (e.g., covering an asymmetric area, not covering a circular area). In other embodiments, the at least one heater 212' can have a shape generally resembling a U-shape (e.g., covering an asymmetric area, not covering a circular area), as shown in FIG. 31. The heating element 210' can have a connector 214' at an end of the extension 210A' that extends from the generally planar area 210B'. The connector 214' can optionally be a 10 pin connector that can connect to the control circuitry (e.g., PCB) 80'. However, other suitable connectors can be used. The first heater 212A' and second heater 212B' can optionally be operated separately (e.g., only one of the first or second heaters 212A', 212B' being on) or simultaneously (e.g., both the first and second heaters 212A', 212B' being on at the same time).

Advantageously, the liquid in the chamber 30' can be heated with only one of the heaters 212A', 212B'. In one embodiment, the first and second heaters 212A', 212B' can have the same operating parameters. In another embodiment, the first and second heaters 212A', 212B' can have different operating parameters. For example, the first heater 212A can operate at approximately 19 volts, 1.39 amps and 12.3 ohms and the second heater 212B can operate at approximately 3.6 volts, 5.6 amps and 0.65 ohms. Power to the one or more heaters 212' can be cycled by the control circuitry 80' to maintain the temperature of the liquid in the chamber 30' at approximately the temperature set point (e.g., user selected temperature set point, default temperature set point, etc.). In one embodiment, both the first and second heaters 212A', 212B' optionally operate at the same time when the drinkware container 100' is disposed on the charging assembly (e.g., charging coaster) 400' and power is provided to the drinkware container 100' by the charging assembly (e.g., charging coaster) 400' as discussed further below. Optionally, only one of the first and second heaters 212A', 212B' is operated when the drinkware container (e.g., mug) 100' is not disposed on the charging assembly (e.g., charging coaster) 400' and the heating element 210' is powered by the one or more power storage elements 60'.

With continued reference to FIG. 26, the heating element 210' can include a plurality of sensors 216'. For example, the heating element 210' can have two sensors 216A', 216B' on an extension 210C' that extends from the generally planar area 210B'. The extension 210C' can extend a distance (e.g., 10 cm, 20 cm) along the height of the inner wall 40A' above the base 20' to measure a liquid level in the chamber 30', as discussed further below. The heating element 210' can also have a third sensor 216C' disposed on the generally planar portion 210B'. The third sensor 216C' is spaced apart (e.g., by about 20 mm) from the first and second heaters 212A', 212B' to inhibit (e.g., prevent) operation of the first and/or second heaters 212A', 212B' from affecting (e.g., biasing) the information sensed by the third sensor 216C'. The plurality of sensors 216' can communicate with the control circuitry 80' via the connector 214'. The one or more heaters 212' (e.g., first heater 212A', second heater 212B') can communicate with the control circuitry 80' via the connector 214'. In one embodiment, the plurality of sensors 216' can be negative temperature coefficient (NTC) thermistors. A temperature sensor 216D', which can optionally be a silicon temperature sensor, is disposed near the sensor 216C' and away from the one or more heaters 212' on the generally planar portion 210B' of the heating element 210'. The temperature sensor 216D' can communicate with the control circuitry 80' via the connector 214'.

The extension 210C' can extend along a distal side portion of the inner wall 40A' and sense information indicative of or corresponding to a liquid level in the chamber 30'. In particular, the sensors 216A', 216B' in the extension 210C' can sense when a liquid level in the chamber 30' is below a threshold and communicate such signal to the control circuitry 80' to adjust an operation of the heating element 210' (e.g., reduce power to, or cease power to, the one or more heaters 212'), such as to avoid temperature overshoot by delivering too much heat to the relatively low level of liquid in the chamber 30'. The sensor 216D' can sense a temperature of the surface 23' and communicate it to the control circuitry 80' as indicative of or corresponding to a temperature of the liquid in the chamber 30'. The one or more heaters 212' can heat liquid in the chamber 30' to between about 120 degrees F. and about 145 degrees F. In one embodiment, the drinkware container 100' can have a default temperature set point of 130 degrees F., unless changed by the user (e.g., via an App using their mobile electronic device, as discussed further below). In one embodiment, one or more of the sensors 216' can allow the control circuitry 80' to automatically turn on when liquid is sensed in the chamber 30'. In another embodiment, one or more of the sensors 216', such as the sensors 216A', 216B', allow the control circuitry 80' to automatically turn off power to the one or more heaters 212' when a liquid level in the chamber 30' is detected signifying that the chamber 30' is nearly empty or empty.

Advantageously, the control circuitry 80' limits power to the one or more heaters 212' so that temperature in the chamber 30' (e.g., temperature of the bottom surface 22') is below a predetermined amount (e.g., no greater than 150 degrees F.), such as when a low liquid level is detected by the sensors 216A', 216B' in the extension 210C' (e.g., when the mug 100' is empty) to inhibit injury to the user. In one embodiment, the control circuitry 80' limits power to the one or more heaters 212' to keep the temperature in the chamber 30' (e.g., at the base 20') below a predetermined amount (e.g., no greater than 100 Celsius) to heat liquid in the chamber 30'. In particular, if firmware malfunctions, a hardwired circuit limits power to the one or more heaters 212' so that they operate below a predetermined temperature (e.g., no greater than 100 Celsius) to inhibit injury to a user, such as if the mug 100' is empty.

In one embodiment, the one or more power storage elements 60' can allow the one or more heaters 212' to operate for at least 15 minutes, at least 30 minutes, at least 45 minutes, etc. while off the charging assembly (e.g., charging coaster) 400'. In one embodiment, the one or more power storage elements 60', fully charged, can provide approximately 1 hour of power to the one or more heaters 212' when not on the charging assembly 400'. Alternatively, when on the charging assembly 400', the one or more heaters 212' can operate all day (e.g., about 8 hours, about 10 hours, about 12 hours, about 15 hours, about 24 hours).

In one embodiment, the charging assembly (e.g., charging coaster) 400' can charge the one or more power storage elements 60' in approximately ninety minutes at 0.5 c charging rate, and at approximately sixty minutes at 1.0 c charging rate (e.g., fast charging). In one embodiment, the user can actuate fast charging of the one or more power storage elements 60' via the app on their mobile electronic device (e.g., smartphone) once it is paired with the drinkware container (e.g. mug) 100'. In one embodiment, the app can allow the user to elect the fast charging option a limited number of times to avoid affecting the working life of the one or more power storage elements 60'. For example, the app can allow the user to elect the fast charging option only once (e.g., once every month, once every few months, once ever, etc.).

The control circuitry 80' can include an accelerometer (e.g., 3-axis accelerometer) to sense motion of the drinkware container 100'. In one embodiment, the control circuitry 80' can "wake up" when motion is sensed (by the accelerometer) after a predetermined period of time in which the drinkware container (e.g., mug) 100' has not moved (e.g., is in a standby state). In one embodiment, upon said sensed motion of the drinkware container (e.g., mug) 100' the visual indicator 395' can optionally illuminate to the preselected color (e.g., color selected by the user via the app on their mobile electronic device to identify their mug). Additionally, movement of the drinkware container 100' after it has been in a standby state, can automatically connect the drinkware container (e.g., mug) 100' to the app in the user's mobile electronic device to which the mug 100' was previously paired. Further, upon movement of the drinkware container (e.g., mug) 100' following a standby state, the control circuitry 80' will seek to detect liquid in the drinkware container (e.g., mug) 100' (e.g., via the sensors 216'). If no liquid is detected after a predetermined period of time (e.g., 1 minute, 3 minutes, 5 minutes, 10 minutes, etc.), the control circuitry 80' will switch the drinkware container (e.g., mug) 100' back to standby state. For example, if the sensors 216A', 216B' sense that the chamber 30' is almost empty or empty, the control circuitry 80' will enter the standby state. The drinkware container (e.g., mug) can continue in a standby state until it is moved or switched off via the button 225'.

When switched off via the button 225', movement of the drinkware container (e.g. mug) 100' does not wake up the control circuitry 80'. Further, as discussed above, the control circuitry 80' can have one or more tilt sensors (e.g., gyroscopes), and the control circuitry 80' will enter the standby state if it sense the drinkware container (e.g., mug) 100 has been turned upside down (e.g., during a cleaning of the mug).

The visual indicator 395', in addition to providing an identification of the drinkware container (e.g., mug) 100' can also provide an indication of operating parameters. For example, when the power level of the one or more power storage elements 60' is below a predetermined amount (e.g., low power), the visual indicator 395' and illuminate solid red. The visual indicator 395' can also indicate a charging state with a different color (e.g., flashing red color) and indicate a fully charged power storage elements 60' with a different color (e.g., solid white).

Figure 27:
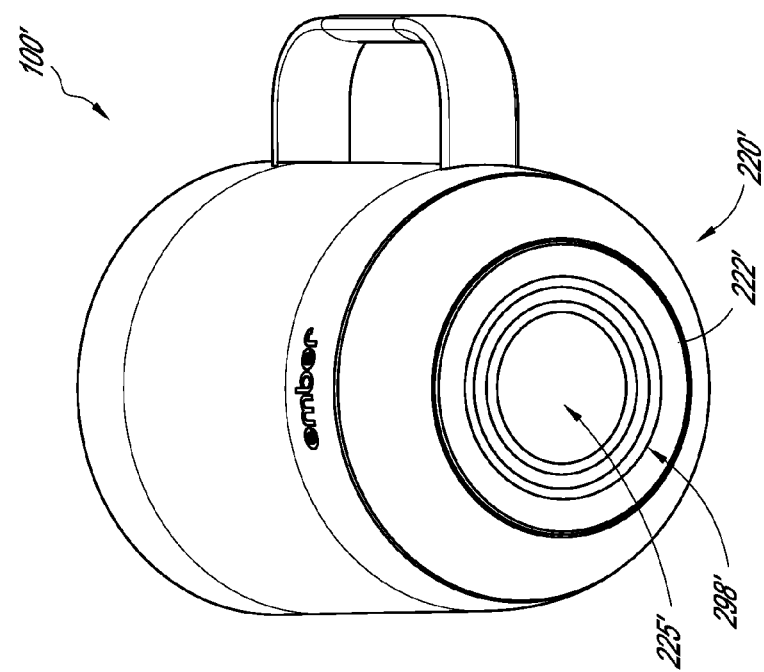
FIG. 27 shows a perspective bottom view of the mug of FIG. 18.
Figure 28:
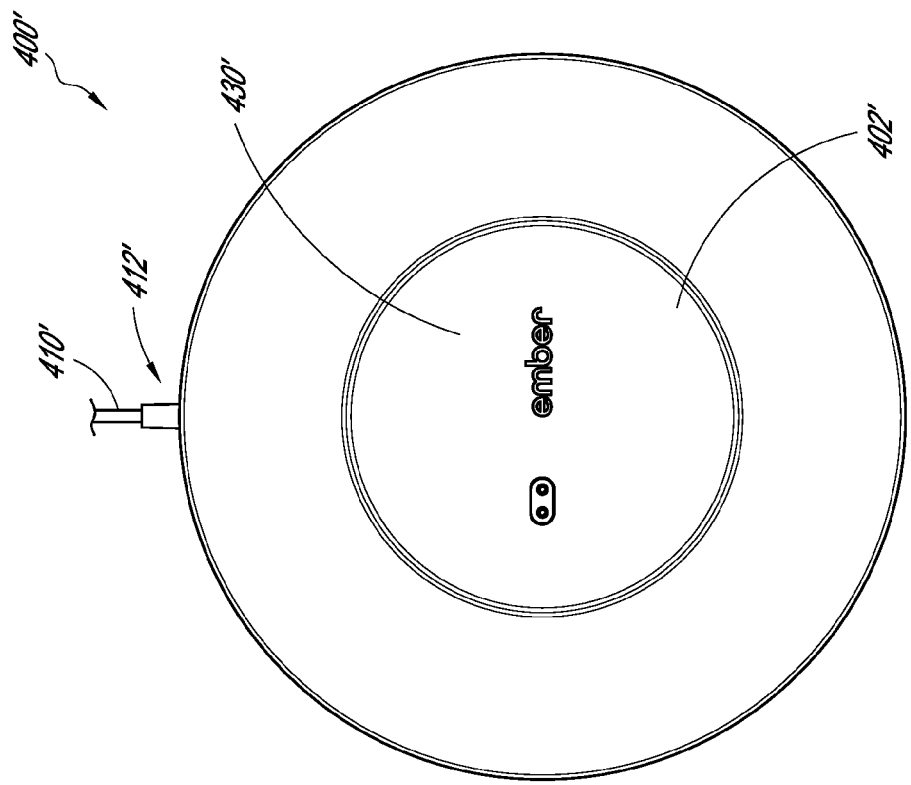
FIG. 28 shows a top view of the charging coaster of FIG. 18.

FIG. 27 shows a perspective bottom view of the drinkware container 100'. The drinkware container (e.g., mug) 100' can have a pair of electrical contacts 298' on the bottom surface 222' of the end cap 220'. The electrical contacts 298' can be a pair or circular electrical contacts. In one embodiment, the electrical contacts 298' can be gold plated. And disposed about the button 225' on the bottom surface 222'. The electrical contacts 298' can contact corresponding electrical contacts 430' (e.g., a pair of pogo pin electrical contacts) on the charging assembly (e.g., charging coaster) 400', as shown in FIG. 28. The charging assembly (e.g., charging coaster) 400' can have a recess 402' sized to receive at least a portion of the drinkware assembly (e.g., mug) 100' (e.g., at least a portion of the end cap 220') so that the electrical contacts 298' contact the corresponding electrical contacts 430'. The recess 402' can be sized to receive drinkware containers (e.g., mugs) 100' of different sizes (e.g., without having to use a different sized charging assembly 400') and still allow the connection between the electrical contacts in the drinkware container (e.g., mug) 100' and the charging assembly 400' to effect power delivery to the drinkware container (e.g., mug) 100'.

The charging assembly (e.g., charging coaster) 400' can have a cable 410' connected via a connector 412' that extends to a power connector (not shown) for delivering power to the charging assembly (e.g., charging coaster) 400'. The power connector can be a wall outlet, USB connector, micro-USB connector, etc. Optionally, the cable 410' can removably connect to the charging coaster 400' via the connector 412' so that the charging coaster 400' can be used without the cable 410 attached to it (e.g., to support the drinkware container 100' as a typical coaster). In another embodiment, the charging assembly (e.g., charging coaster) 400' can house one or more batteries to be able to charge the drinkware container (e.g., mug) 100' when on the charging coaster 400' while being portable (e.g., while not connected to a power source via the cable 410').

As discussed above, the control circuitry 80' can have a transmitter, receiver and/or transceiver to allow the drinkware container (e.g., mug) 100' to communicate with a mobile electronic device (e.g. smartphone) as discussed above in connection with FIG. 15. The mobile electronic device can receive information from the drinkware container (e.g., mug) 100', such as one or more of temperature set point, battery charge level, liquid level, an alert signal that the mug 100' has tipped over, etc. The drinkware container (e.g., mug) 100' can receive information, instructions or settings from the mobile electronic device, such as one or more of a temperature set point to heat the liquid in the mug 100' to, a color selection for the visual indicator 395' to identify the mug 100' (e.g., identify the mug 100' as the user's mug, relative to other mugs 100' that may be in use) to help the user identify which mug 100' is theirs.

In one embodiment, the control circuitry 80' can provide for voice control of the operation of the drinkware container (e.g., mug) 100'. For example, the control circuitry 80' can have a microphone for receiving voice commands from the user. In another embodiment, the user can provide voice commands to the drinkware container (e.g., mug) 100 via the intelligent assistant (e.g., Siri) on the user's mobile electronic device that is paired with the drinkware container (e.g., mug) 100'.

In another embodiment, the drinkware container (e.g., mug) 100' can have a built in speaker for notifying the user when the liquid in the chamber 30' has reached the user selected temperature. For example, the control circuitry 80' can have a "drink ready" notice provided to the user.

In still another embodiment, the temperature control module 200' can instead be a ring (not shown) that is placed around a conventional mug that has no electronics in it to provide for temperature delivery to the ceramic mug. Power to the temperature control module 200' can be provided by inductive coupling when the ceramic mug is placed on the charging assembly (e.g., charging coaster) 400'.

In another embodiment, the drinkware container (e.g., mug) 100' can have a display screen that displays the type of drink the user wants. The type of drink can be based on a drinking history tracked, for example, by the app on the mobile electronic device that is paired with the drinkware container (e.g., mug) 100'. The app can track the types of drinks the user consumes at different times of day and can display a type of drink on the mug 100' at said time of day, which the user can alter (swipe through different selections on the display screen). The user can then just hand the drinkware container (e.g., mug) 100' to the coffee house attendee, who can simply read the drink type on the display screen to complete the order.

Though the features disclosed above may be described in connection with the container 100, such as a mug, one of skill in the art will recognize that any of the features described in this embodiment can also apply to any drinkware, dishware, serverware, and storage container (e.g., cup, travel mug, baby bottle, sippy cup, thermos, water bottle, such as a reusable water bottle, carafe, soup container, bowl, plate, platter, food storage containers, such as Tupperware® containers, lunch boxes).

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are described for drinkware containers, the features are applicable to containers that are not drinkware containers (e.g., plates, bowls, serverware, food storage containers) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Though the features and ideas disclosed above may be related to actively heating or cooling food or beverage, the embodiments above may also be used to heat or cool air spaces, such as refrigeration devices, cold boxes, coolers, portable coolers, or portable refrigerators, or hot boxes, or warmer drawers, or heat chambers, or any other device that would benefit from the heating or cooling of the air within a defined cavity or chamber.

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the container, as disclosed herein. That is, the electronic module or electronics can have different form factors.

Of course, the foregoing description is that of certain features, aspects and advantages of the present invention, to which various changes and modifications can be made without departing from the spirit and scope of the present invention. Moreover, the heated or cooled drinkware need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed containers.

What is claimed is:

1. An actively heated beverage container system, comprising:
   a container made of metal and having a body with an open top end, a circumferential wall and a base, the circumferential wall comprising an inner circumferential wall and an outer circumferential wall spaced from each other to define an annular gap therebetween, the body having a chamber defined by the inner circumferential wall and the base, the outer circumferential wall extending distally of the base and defining a cavity below the base and an opening at a distal end of the body;
   a cap coupled to the outer circumferential wall and configured to seal the cavity and the opening at the distal end of the body, the cap defining a bottom surface of the beverage container; and
   a temperature control module housed in the cavity comprising
      at least one heating element in thermal communication with one or both of the base and a side surface of the inner circumferential wall to heat at least a portion of the chamber,
      control circuitry configured to control operation of the at least one heating element,
      at least one power storage element configured to provide power to one or both of the control circuitry and the at least one heating element,
      one or both of a wireless transmitter configured to transmit information of the module to a remote electronic device and a wireless receiver configured to receive information from the remote electronic device including one or more temperature settings, the control circuitry configured to operate the at least one heating element to heat a liquid in the chamber to said one or more temperature settings; and
   a button disposed on a surface of the container and configured to actuate a switch of the control circuitry when pressed by the user, the button operable by the user to:
      turn on power to the temperature control module,
      turn off power to the temperature control module,
      initiate a pairing operation of the container with the remote electronic device,
      and reset one or more operating parameters of the temperature control module.

2. The system of claim 1, wherein the annular gap is filled with an insulative material.

3. The system of claim 1, wherein the outer circumferential wall and inner circumferential wall are coated with a ceramic material.

4. The system of claim 1, wherein the container is a mug.

5. The system of claim 1, further comprising at least one sensor configured to sense a parameter of a liquid in the chamber, the at least one sensor comprising at least one temperature sensor in thermal communication with the base and be laterally spaced apart from the at least one heating element by approximately 20 mm to inhibit operation of the at least one heating element from biasing sensed temperature readings of the at least one temperature sensor.

6. The system of claim 1, wherein the container comprises a plurality of temperature sensors arranged vertically along the inner circumferential wall, the control circuitry configured to determine a liquid level in the chamber based at least on sensed temperature readings from at least two of the plurality of temperatures sensors, at least one of the plurality of temperature sensors operable to detect when a liquid is poured into the chamber and to communicate a liquid detection signal to the control circuitry, the control circuitry configured to automatically turn on based on said liquid detection signal.

7. The system of claim 1, further comprising one or more electrical contacts on a surface of the cap that are configured to contact one or more electrical contacts on a charging base when the container is placed on the charging base.

8. The system of claim 1, wherein the control circuitry of the temperature control module is operable to turn on upon receiving a motion detection signal from a motion sensor indicating movement of the container, and enter a standby state where no power is delivered to the at least one heater if the control circuitry does not receive a liquid detection signal within a predetermined time period following receipt of the motion signal.

9. An actively heated beverage container system, comprising:
   a container made of metal and having a body with an open top end, a circumferential wall and a base, the body having a chamber defined by the inner circumferential wall and the base, the circumferential wall including an inner circumferential wall and an outer circumferential wall spaced apart from the inner circumferential wall and defining an annular channel therebetween, the outer circumferential wall extending distally of the base and defining a cavity below the base and an opening at a distal end of the body;
   a cap coupled to the outer circumferential wall and configured to seal the cavity and the opening at the distal end of the body, the cap defining a bottom surface of the container; and
   a temperature control module housed in the cavity, comprising
      at least one heating element in thermal communication with a surface of the chamber to heat at least a portion of the chamber,
      control circuitry configured to control operation of the at least one heating element,
      at least one power storage element configured to provide power to one or both of the control circuitry and the at least one heating element;
      one or both of a wireless transmitter configured to transmit information to a remote electronic device and a wireless receiver configured to receive information from the remote electronic device including one or more temperature settings, the control circuitry configured to operate the at least one heating element to heat a liquid in the chamber to said one or more temperature settings; and
   a visual indicator disposed behind a surface of the cap and configured to illuminate in a plurality of colors, the visual indicator operable by the control circuitry to illuminate in a user selected color chosen via the remote electronic device to identify the container, wherein the control circuitry is configured to operate the visual indicator to illuminate at the user selected color upon receiving a sensed motion signal from a motion sensor indicating movement of the container.

10. The system of claim 9, wherein the control circuitry of temperature control module is operable to turn on upon receiving the sensed motion signal, and configured to enter a standby state where no power is delivered to the one or more heaters if the control circuitry does not receive a liquid detection signal within a predetermined time period following receipt of the sensed motion signal.

11. The system of claim 9, wherein the at least one heating element is in thermal communication with the base.

12. The system of claim 9, wherein the outer circumferential wall and inner circumferential wall are coated with a ceramic material.

13. The system of claim 9, further comprising at least one sensor configured to sense a parameter of a liquid in the chamber, the at least one sensor comprising at least one temperature sensor configured to contact the surface of the body and be laterally spaced from the at least one heating element.

14. The system of claim 9, wherein the container comprises a plurality of sensors arranged vertically adjacent the inner circumferential wall, the control circuitry configured to determine a liquid level in the chamber based at least on sensed readings from at least two of the plurality of sensors, at least one of the plurality of sensors operable to detect when a liquid is poured into the chamber and to communicate a liquid detection signal to the control circuitry, the control circuitry configured to automatically turn on based on said liquid detection signal.

15. The system of claim 9, further comprising a button disposed on a surface of the container and configured to actuate a switch of the control circuitry when pressed by the user.

16. The system of claim 9, further comprising one or more electrical contacts on a surface of the container that are configured to contact one or more electrical contacts on a charging base when the container is placed on the charging base.

17. The system of claim 9, wherein the at least one heating element comprises two heating elements that define a crescent shaped heating area on an outer surface of the base of the body.

18. The system of claim 17, further comprising a temperature sensor disposed on the outer surface of the base of the body on a same plane as the at least one heating element, the temperature sensor being laterally spaced from the at least one heating element so that operation of the at least one heating element does not bias the sensed temperature readings of the temperature sensor.

19. An actively heated mug system, comprising:
 a container made of metal and having a body with an open top end, an inner circumferential wall and an outer circumferential wall spaced from each other to define an annular gap therebetween, the body having a chamber defined by the inner circumferential wall and a base, the outer circumferential wall extending distally of the base and defining a cavity below the base and an opening at a distal end of the body;
 a cap coupled to the outer circumferential wall and configured to seal the cavity and the opening at the distal end of the body, the cap defining a bottom surface of the container; and
 a temperature control module housed in the cavity comprising
  at least one heating element in thermal communication with one or both of the base and a side surface of the inner circumferential wall to heat at least a portion of the chamber,
  at least one power storage element configured to provide power to the at least one heating element, and
  control circuitry configured to control operation of the at least one heating element, the control circuitry being configured to
 wirelessly communicate with a mobile electronic device paired with the container, including receiving one or more user selected temperature settings from the mobile electronic device, the control circuitry configured to operate the at least one heating element to heat a liquid in the chamber to said one or more user selected temperature settings,
 receive a motion detection signal from a motion sensor in the container indicating movement of the container,
 receive a liquid detection signal from a sensor in the container indicating the presence of liquid in the chamber, and
 operate the at least one heating element upon receiving the motion detection signal and liquid detection signal to heat the liquid in the chamber to the user selected temperature setting; and
 a button disposed on a surface of the container and configured to be depressed by user to actuate the control circuitry to perform one or more functions chosen from the group consisting of turning on power to the temperature control module, turning off power to the temperature control module, initiating a pairing operation with the mobile electronic device, and resetting the temperature control module.

20. The system of claim 19, wherein the control circuitry is further configured to automatically enter a standby state where no power is delivered to the at least one heater if the control circuitry does not receive the liquid detection signal within a predetermined time period following receipt of the motion detection signal.

\* \* \* \* \*